United States Patent
Collins et al.

(10) Patent No.: US 6,606,218 B2
(45) Date of Patent: Aug. 12, 2003

(54) SINGLE TAPE CARTRIDGE INTERFACE HAVING A CARTRIDGE REINSERTION PREVENTING MECHANISM IN AN AUTOMATED AUTOLOADER/LIBRARY SYSTEM

(75) Inventors: Paddy Elliot Collins, Colorado Springs, CO (US); Thomas Allen Thorson, Colorado Springs, CO (US)

(73) Assignee: Quantum Corporation, Milpitas, CA (US)

( * ) Notice: Subject to any disclaimer, the term of this patent is extended or adjusted under 35 U.S.C. 154(b) by 153 days.

(21) Appl. No.: 09/896,907

(22) Filed: Jun. 28, 2001

(65) Prior Publication Data

US 2002/0057520 A1 May 16, 2002

Related U.S. Application Data

(63) Continuation-in-part of application No. 09/710,645, filed on Nov. 10, 2000.

(51) Int. Cl.[7] .............................................. G11B 15/68
(52) U.S. Cl. ......................................................... 360/92
(58) Field of Search ..................................... 360/92, 94

(56) References Cited

U.S. PATENT DOCUMENTS

| | | | |
|---|---|---|---|
| 4,063,294 A | 12/1977 | Burkhart | 360/92 |
| 4,910,619 A | 3/1990 | Suzuki et al. | |

(List continued on next page.)

FOREIGN PATENT DOCUMENTS

| | | |
|---|---|---|
| DE | 37 21821 C1 | 10/1988 |
| EP | WO 89/08311 | 8/1989 |
| EP | 0 334 257 A2 | 9/1989 |
| EP | 0 426 456 B1 | 5/1991 |
| EP | 0 578 536 A3 | 1/1994 |
| EP | 0 725 398 B1 | 8/1996 |
| EP | 1 045 382 A3 | 10/2000 |
| JP | 62 134852 | 6/1987 |
| JP | 62 239372 | 10/1987 |
| JP | 06 052657 | 2/1994 |
| WO | WO 01/0988 A1 | 2/2001 |
| WO | WO 02/11135 A1 | 2/2002 |

OTHER PUBLICATIONS

Material from Worldwide Web @ www.m4data–usa.com/products/magfile_1.html.

*Primary Examiner*—A. J. Heinz
(74) *Attorney, Agent, or Firm*—Morrison & Foerster LLP

(57) ABSTRACT

The single cartridge interface includes a cartridge stop link that cooperates with an interface door and doorstop to control the receipt of tape cartridges in the single cartridge interface. The cartridge stop link mechanically couples to tape cartridges during an ejection operation to prevent a reinsertion of cartridges until the tape cartridge is fully removed from the tape cartridge interface. Once a tape cartridge is removed from the single cartridge interface, the door and doorstop prevent insertion of tape cartridges until the picker is in position to receive cartridges from the single cartridge interface.

12 Claims, 24 Drawing Sheets

U.S. PATENT DOCUMENTS

| | | | |
|---|---|---|---|
| 4,981,409 A | | 1/1991 | Hirose et al. |
| 5,089,920 A | * | 2/1992 | Bryer et al. .................. 360/92 |
| 5,196,972 A | * | 3/1993 | Matsumaru et al. .......... 360/94 |
| 5,293,284 A | | 3/1994 | Sato et al. |
| 5,430,588 A | * | 7/1995 | Rasmussen ................. 360/92 |
| 5,449,091 A | | 9/1995 | Dalziel ........................ 221/81 |
| 5,469,310 A | | 11/1995 | Slocum et al. |
| 5,515,213 A | | 5/1996 | Elliott ......................... 360/92 |
| 5,537,378 A | | 7/1996 | Uehara et al. |
| 5,631,785 A | | 5/1997 | Dang et al. |
| 5,682,276 A | | 10/1997 | Hinnen et al. ................ 360/92 |
| 5,746,385 A | | 5/1998 | Leger et al. ................ 242/337 |
| 5,752,668 A | | 5/1998 | Patterson et al. ............ 242/337 |
| 5,760,995 A | | 6/1998 | Heller et al. .................. 360/92 |
| 5,793,564 A | | 8/1998 | Nakase et al. |
| 5,847,897 A | | 12/1998 | Marlowe ..................... 360/92 |
| 5,856,894 A | | 1/1999 | Marlowe ..................... 360/92 |
| 5,959,803 A | | 9/1999 | Okamoto et al. ............. 360/92 |
| 5,973,876 A | * | 10/1999 | Yeakley et al. ............... 360/92 |
| 5,975,450 A | | 11/1999 | Leger et al. ................ 242/337 |
| 5,999,356 A | | 12/1999 | Dimitri et al. |
| 6,097,566 A | | 8/2000 | Heller et al. .................. 360/92 |
| 6,130,800 A | | 10/2000 | Ostwald ...................... 360/92 |

* cited by examiner

SINGLE TAPE CARTRIDGE INTERFACE HAVING A CARTRIDGE REINSERTION PREVENTING MECHANISM IN AN AUTOMATED AUTOLOADER/LIBRARY SYSTEM

CROSS REFERENCE TO RELATED APPLICATIONS

This application is a continuation in part of U.S. patent application Ser. No.: 09/710,645 filed on Nov. 10, 2000, titled "Automated Tape Cartridge Autoloader/Library System," and which is incorporated herein by reference in its entirety.

FIELD OF THE INVENTION

The invention is related to the field of data storage, and in particular, to a single cartridge interface for an automated tape cartridge autoloader/library system.

BACKGROUND OF THE INVENTION

A popular device for handling large amounts of information in a data processing system is an automated tape cartridge library. Tape cartridge libraries store and manage large numbers of tape cartridges containing magnetic tape on which data is recorded. Typically, a tape cartridge library is comprised of a plurality of fixed tape cartridge storage locations and at least one read/write tape drive. The tape cartridge storage locations are arranged in predetermined arrays of uniquely identified cells with each cell containing a single tape cartridge. Each of the individual tape cartridges include a computer readable identifying indicia, such as a bar code.

A tape cartridge retrieval/transport mechanism, known in the art as a "cartridge picker," automatically exchanges the individual tape cartridges between their storage locations and the tape drive. Different types of cartridge pickers are used to accommodate the various tape cartridge arrangements in different tape cartridge library systems. One example of a cartridge picker utilizes a rotatable robotic arm with an optical sensor for selecting and retrieving the correct tape cartridge and transporting the tape cartridge to a tape drive. Another example of a cartridge picker is a linear robotic mechanism that moves along an X-Y translation or about a pivot in a rotary motion to select, retrieve and transport tape cartridges to a tape drive. The tape drive is operable to read/write data from or to the magnetic tape in the tape cartridge, while a host computer that communicates with a library control unit controls operation of the tape library system.

Some tape cartridge library systems also include a single cartridge interface designed to receive individual tape cartridges from an operator during operation of the library. These single cartridge interfaces also receive tape cartridges ejected from the library system by a cartridge picker.

Unfortunately, it is a problem in libraries with a single cartridge interface to prevent damage to the cartridge picker and/or tape cartridges. The damage is most often caused by the insertion of tape cartridges through the single cartridge interface when the cartridge picker is not positioned to receive the tape cartridge. Another cause of damage occurs following an ejection operation where the tape cartridge has not been removed from the single cartridge interface and an operator attempts to reinsert the cartridge. In this case, the tape cartridge, while not fully removed from the single cartridge interface, is in an ejected position that permits the cartridge picker to perform additional operations within the library. The cartridge picker and/or the tape cartridge can be seriously damaged if an operator attempts to reinsert the tape cartridge after the cartridge picker has left the single cartridge interface retrieval location.

SUMMARY

The present invention solves the above described problems and advances the art by providing a single cartridge interface for an automated tape cartridge library system, termed "autoloader/library system" herein, that prevents damage to a cartridge picker. Specifically, the present single cartridge interface is configured to prevent the receipt of tape cartridges unless the picker is positioned to receive the tape cartridge. The present single cartridge interface is also configured to prevent the reinsertion of tape cartridges in an ejected position, but not fully removed from the single cartridge interface.

The autoloader/library system comprises at least one read/write tape drive, a tape cartridge picker, a single tape cartridge interface, and at least one tape cartridge transport magazine. The autoloader/library system is a complete tape cartridge library that stores, manages, and automatically exchanges a plurality of tape cartridges between the tape drive unit, the single cartridge interface, and the at least one tape cartridge transport magazine.

The present single cartridge interface comprises a cartridge stop link that cooperates with an interface door and doorstop to control the receipt of tape cartridges in the single cartridge interface. The cartridge stop link mechanically couples to tape cartridges during an ejection operation to prevent a reinsertion of cartridges until the tape cartridge is fully removed from the tape cartridge interface. Once a tape cartridge is removed from the single cartridge interface, the door and doorstop prevent insertion of tape cartridges until the picker is in position to receive cartridges from the single cartridge interface.

As will become apparent from the following description, a first advantage of the present single cartridge interface is its simple but effective design. A second advantage of the present single cartridge interface is that tape cartridges are not ejected onto the floor, but rather, are retained partially in the interface, while at the same time reinsertion of the cartridge is prevented and the picker is free to perform other operations within the library system. A third advantage of the present single cartridge interface is that the doorstop is only operated during receipt of tape cartridges from an operator, thus lessoning system workload.

DETAILED DESCRIPTION

Figure 1:
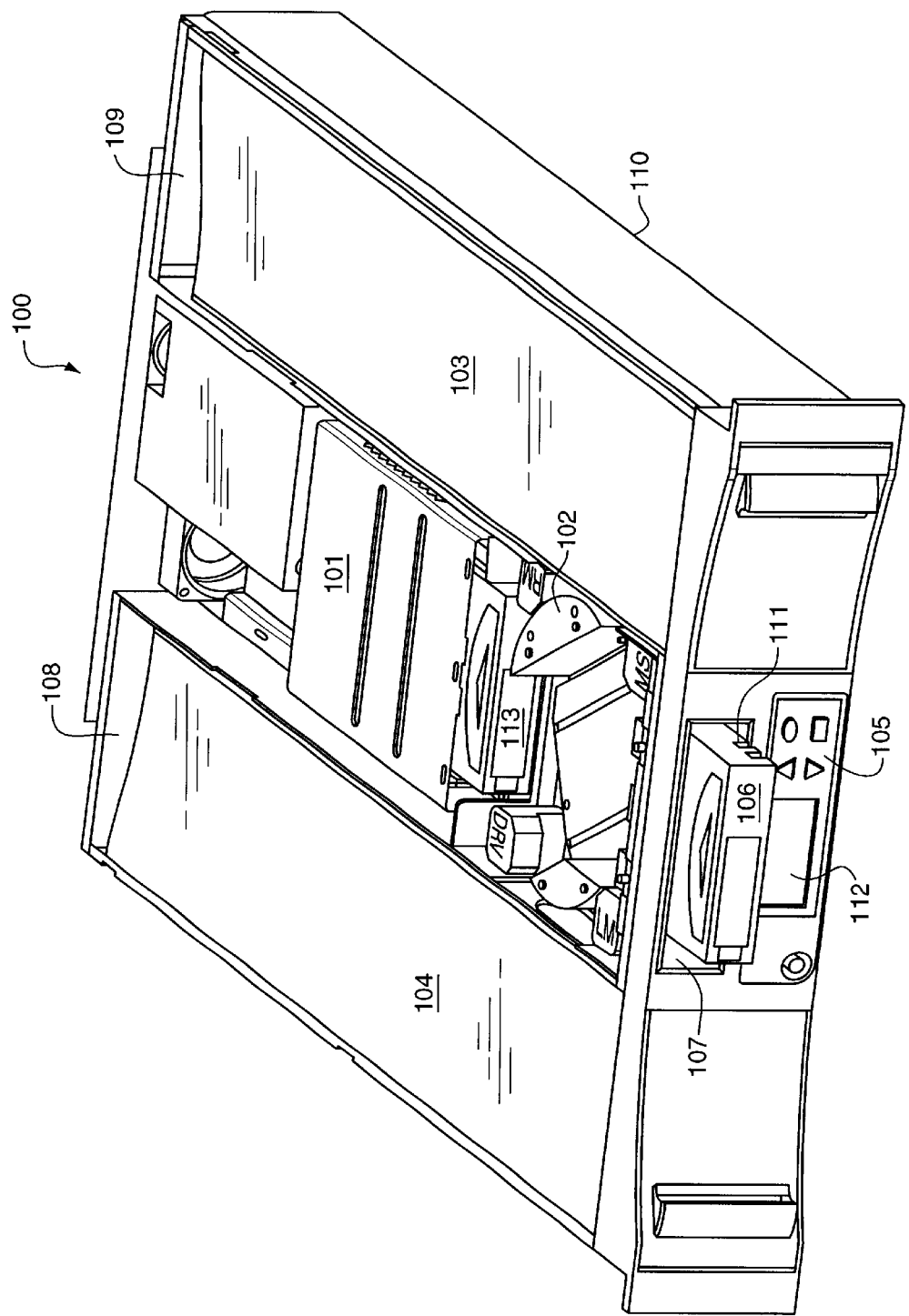
FIG. 1 illustrates an example of a tape cartridge autoloader/library system configured with a single cartridge interface according to the present invention.
Figure 2:
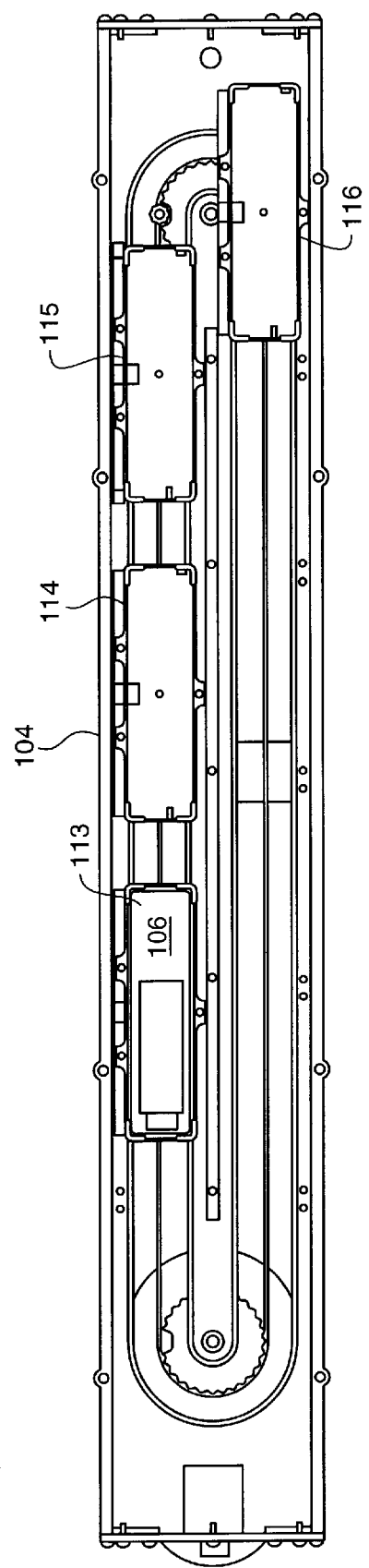
FIG. 2 illustrates a cross sectional view of a tape cartridge transport magazine for the tape cartridge autoloader/library system.

Tape Cartridge Autoloader/Library Systems—FIGS. 1 and 2

For purposes of illustration and not of limitation, various features and advantages of the present single cartridge interface will now be described within the context of an autoloader/library system configured to accommodate a plurality of DLT tape cartridges. It is to be understood that the following description with respect to the example of the autoloader/library system and DLT tape cartridges disclosed herein is not intended to limit the scope of the present invention. It would be obvious to one skilled in the art that the principles of the present invention could easily be applied to other tape libraries, autoloaders, autoloader/library systems and tape cartridge formats.

FIG. 1 depicts an example of an automated tape cartridge autoloader/library system 100. The primary components of the autoloader/library system 100 are a read/write tape drive 101, a tape cartridge picker 102, a single tape cartridge interface 107, and a pair of tape cartridge transport magazines, 103 and 104, enclosed in a housing 110. The autoloader/library system 100 also comprises a control panel 105 that receives control inputs from an operator and includes a user interface 112 to provide status information to the operator.

The autoloader/library system 100 is a complete tape cartridge library that stores, manages, and automatically exchanges a plurality of tape cartridges, e.g. 106 and 113, between the tape drive 101, the single cartridge interface 107, and the tape cartridge transport magazines, 103 and 104. The autoloader/library system 100 could also include multiple tape drives and could be configured to accommodate multiple tape media formats as a matter of design choice by simply incorporating the appropriate tape drive format into the autoloader/library system 100. Some examples of the tape cartridge media 106 include without limitation, DLT, LTO, 8 millimeter, and SDLT tape cartridges.

Advantageously, the autoloader/library system 100 includes a compact form factor due in large part to the cartridge picker 102 and tape cartridge transport magazines 103 and 104. The rotating cartridge picker 102 in combination with the transport magazines, 103 and 104, permits a coplanar construction of the autoloader/library system 100 facilitating the compact form factor. In one example of the autoloader/library system 100, the housing 110 including the tape cartridge transport magazines, 103 and 104, the tape drive 101, the cartridge picker 102, and all control elements including motors, circuitry, and processors, measures approximately three and one half inches in height and fits in a standard rack mount. Also, advantageously, the storage and management of the plurality of tape cartridges, e.g. 106 and 113, in the compact form factor of the autoloader/library system 100 is provided by the cartridge picker 102 in combination with the individual tape cartridge transport magazines, 103 and 104.

The tape cartridge transport magazines, 103 and 104, are each configured to receive and store a plurality of individual tape cartridges, e.g. 106, in a plurality of individual tape cartridge storage locations. In one example of the present invention, the tape cartridge transport magazines 103 and 104 are each configured to store eight DLT tape cartridges. Those skilled in the art will appreciate that the number of cartridges stored would vary as a function of cartridge format and form factor. Additionally, one of the magazines, 103 and 104, could accommodate more or less tape cartridges than the other one of the magazines, 103 and 104.

The tape cartridge transport magazines, 103 and 104, are also configured to transport the individual tape cartridges, e.g. 106, in a vertical closed loop within the tape cartridge transport magazines, 103 and 104, so that any one of the stored tape cartridges can be positioned for selection by the cartridge picker 102. FIG. 2 depicts a cross sectional view of the interior of the tape cartridge transport magazine 104 used to illustrate the transportation of the tape cartridges within the tape cartridge transport magazines, 103 and 104. The plurality of tape cartridges are loaded into the tape cartridge transport magazines, 103 and 104, by sliding the individual tape cartridges, e.g. 106, into individual carriages, e.g. 113–116, in a horizontal relationship relative to the magazines, 103 and 104. The tape cartridges, e.g. 106, are transported in the magazine 104 by rotating the carriages 113–116 within the vertical closed loop to the different locations in the tape cartridge magazine 104.

The cartridge picker 102 is configured to rotate and exchange the individual tape cartridges, e.g. 106, with one of the tape drive 101, the magazine 104, the magazine 103, and the single cartridge interface 107. Advantageously, the use of the rotating cartridge picker 102 in combination with the transport mechanisms in the magazines, 103 and 104, significantly limits the operation required for a tape cartridge exchange. The present cartridge picker 102 simply rotates between the tape cartridge transport magazines, 103 and 104, the single cartridge interface 107, and the tape drive 101, to exchange tape cartridges, e.g. 106. Advantageously, the autoloader/library system 100 provides fast and efficient exchange of tape cartridges between the magazines, 103 and 104, the single cartridge interface 107, and the tape drive 101. Also advantageously, the tape cartridges are not flipped or re-oriented during transport within the magazines, 103 and 104, or during exchange with the cartridge picker 102. The tape cartridges, e.g. 106, are always in the proper orientation for retrieval by the cartridge picker 102, and for presentation to the tape drive 101, single cartridge interface 107, and tape cartridge magazines, 103 and 104.

Once selected by the cartridge picker 102, an individual tape cartridge, e.g. 106, could be provided to one of the following locations depending on the desired operation to be performed. If a read/write operation is desired, the cartridge picker 102 provides the selected tape cartridge 106 to the tape drive 101. If an ejection operation is desired, the cartridge picker 102 provides the selected tape cartridge 106 to the single cartridge interface 107 for retrieval by an operator. If a load balancing operation is desired, the cartridge picker 102 exchanges the tape cartridge 106 between tape cartridge transport magazine 103 and tape cartridge transport magazine 104. As will become apparent from the following description, the cartridge picker 102 could also provide the selected tape cartridge 106 to another tape cartridge transport magazine in another coupled tape cartridge autoloader/library system. Finally, the cartridge picker 102 could provide the selected tape cartridge, e.g. 106, to another tape drive in a coupled tape cartridge autoloader/library system.

Figure 3:
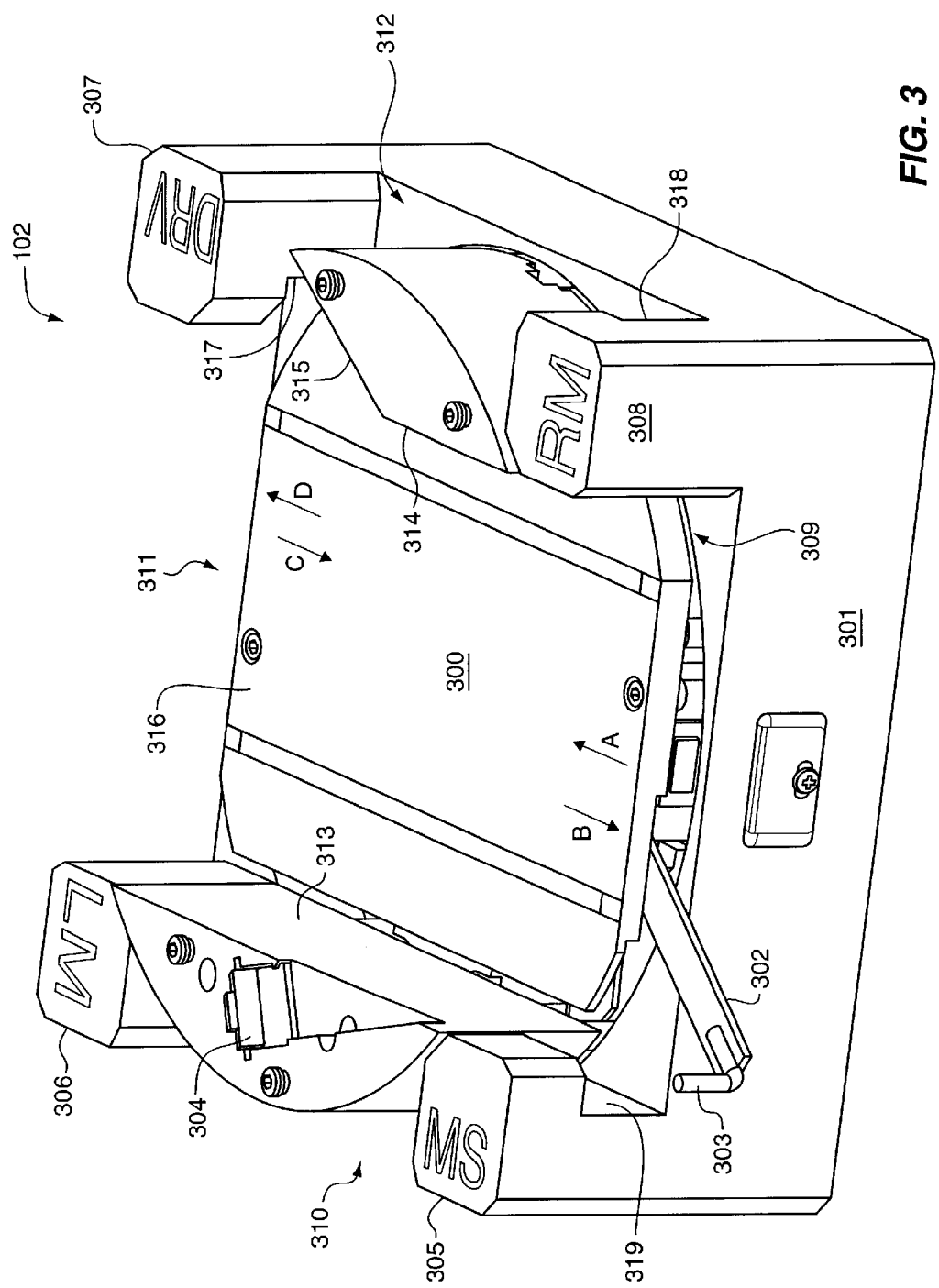
FIG. 3 illustrates a tape cartridge picker for the tape cartridge autoloader/library system.

The Cartridge Picker FIG. 3

For purposes of illustration, the tape cartridge 106 is used throughout the following description of the cartridge picker 102. It should be understood, however, that the cartridge picker 102 could be easily designed according to the principles of the present invention to accommodate numerous tape cartridge formats other than the DLT format of the cartridge 106.

The cartridge picker 102 comprises a translation arm 302 and a turntable 300 rotatably connected to a stationary base 301. The turntable 300 includes a central cavity 316 configured to receive the tape cartridge 106 on the turntable 300. Parallel walls, 313 and 314, and a wall 315 integrally formed at a thirty-degree angle to wall 314, define the central cavity 316. Alternatively, the wall 315 could be formed at an angle in the range of twenty to forty degrees depending on the geometry of the cartridge. As will become apparent from the following description, the angle of the wall 315 permits the translation arm 302 to pass behind the tape cartridge 106 during loading from the single cartridge interface 107. The translation arm 302 comprises a perpendicular cartridge pin 303 integrally formed in one end. The pin 303 is configured to engage or seat in a notch 111 (shown on FIG. 1) formed in the tape cartridge 106.

The cartridge picker 102 also comprises a bar code reader 304 for reading computer readable indicia on the tape cartridges. The bar code reader 304 could be configured in any suitable manner that permits the bar code reader 304 to read the indicia on the tape cartridges. In one example of the present invention, the bar code reader 304 includes a mirror that reflects an image of the indicia on the tape cartridge to the bar code reader 304. Since the cartridge picker 102 rotates, the bar code reader 304 could be located at numerous other locations on the cartridge picker 102 as a matter of design choice. Alternatively, in some applications, the bar code reader 304 could be separate from the picker 102 and located in the autoloader/library system 100.

The picker base 301 comprises four vertical columns 305–308 that define four cartridge exchange ports 309–312. As will become apparent from the following description, columns 305, 307, and 308 are undercut in portions 317–319 so that the columns 305, 307, and 308 do not interfere with the translation arm 302 during retrieval and delivery of the tape cartridge 106. Operationally, the turntable 300 rotates within the base 301 to exchange the tape cartridge 106 with the single cartridge interface 107 the tape drive 101 and the tape cartridge transport magazines, 103 and 104, through the exchange ports 309–312. Specifically, the turntable 300 exchanges the tape cartridge 106 with the magazine 103 through the exchange port 309, exchanges the tape cartridge 106 with the single cartridge interface 107 through the exchange port 310, exchanges the tape cartridge 106 with the magazine 104 through the exchange port 311, and exchanges the tape cartridge 106 with the tape drive 101 through the exchange port 312.

Operation FIGS. 4–19

When the tape cartridge 106 is exchanged between the cartridge picker 102 and the tape drive 101, or between the cartridge picker 102 and the magazines 103 and 104, the cartridge 106 is received in the cavity 316 in direction (A) and ejected from the cavity 316 in direction (B) as exemplified in FIG. 3. In the context of the present application this is defined as the front of the turntable 300 regardless of the exchange port, e.g. 309, that the picker 102 is aligned with. Similarly, when the tape cartridge 106 is exchanged between the cartridge picker 102 and the single cartridge interface 107, the cartridge 106 is received in the cavity 316 from the opposite end of the cavity 316 in direction (C) and ejected from the cavity 316 in direction (D). In the context of the present application this is defined as the rear of the turntable 300 regardless of the exchange port, e.g. 309, that the picker 102 is aligned with. As will become apparent from the following description, this permits the cartridge 106 to always be oriented in the same direction when it is located in the cavity 316.

Figure 7:
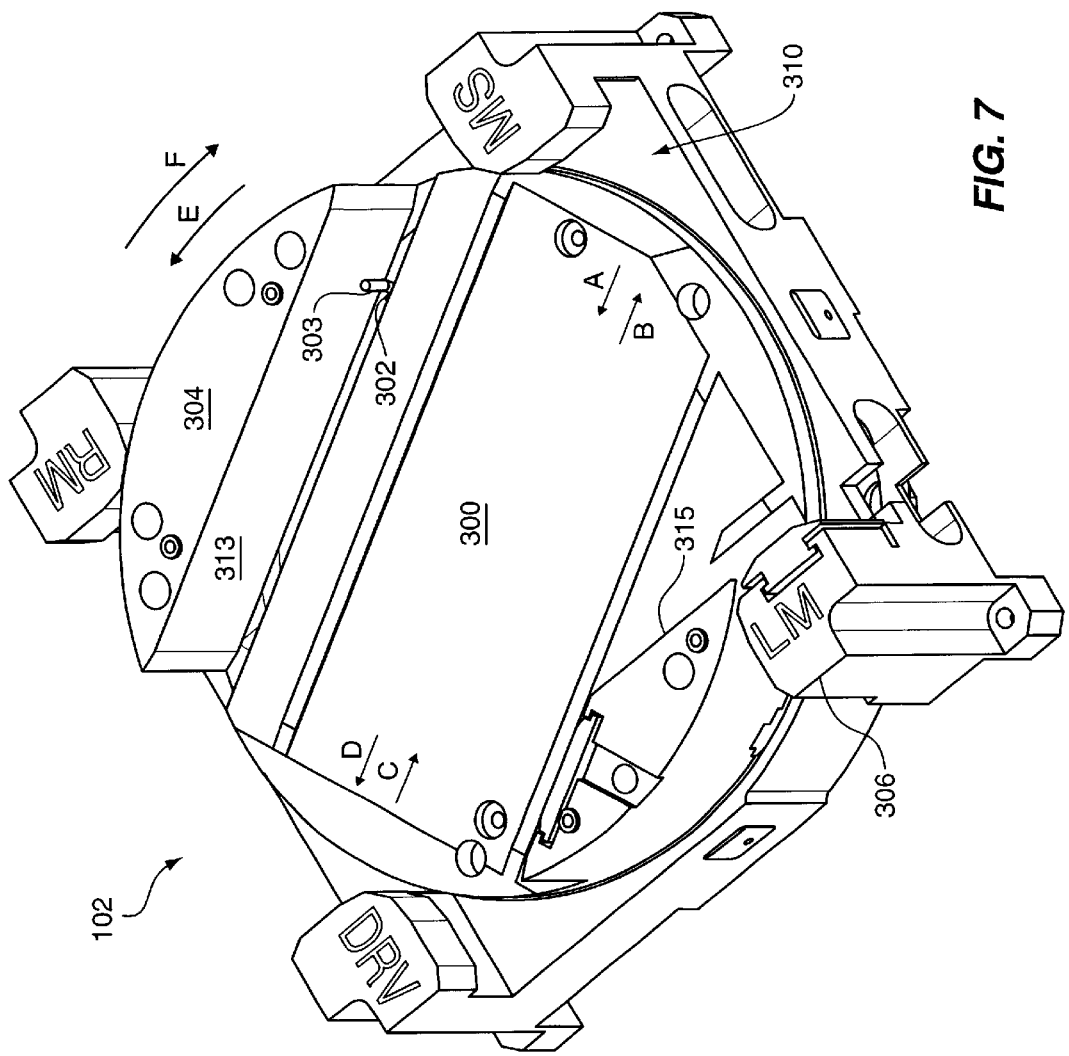
FIG. 7 is a perspective view of the tape cartridge picker used to illustrate the operation of the tape cartridge autoloader/library system.
Figure 8:
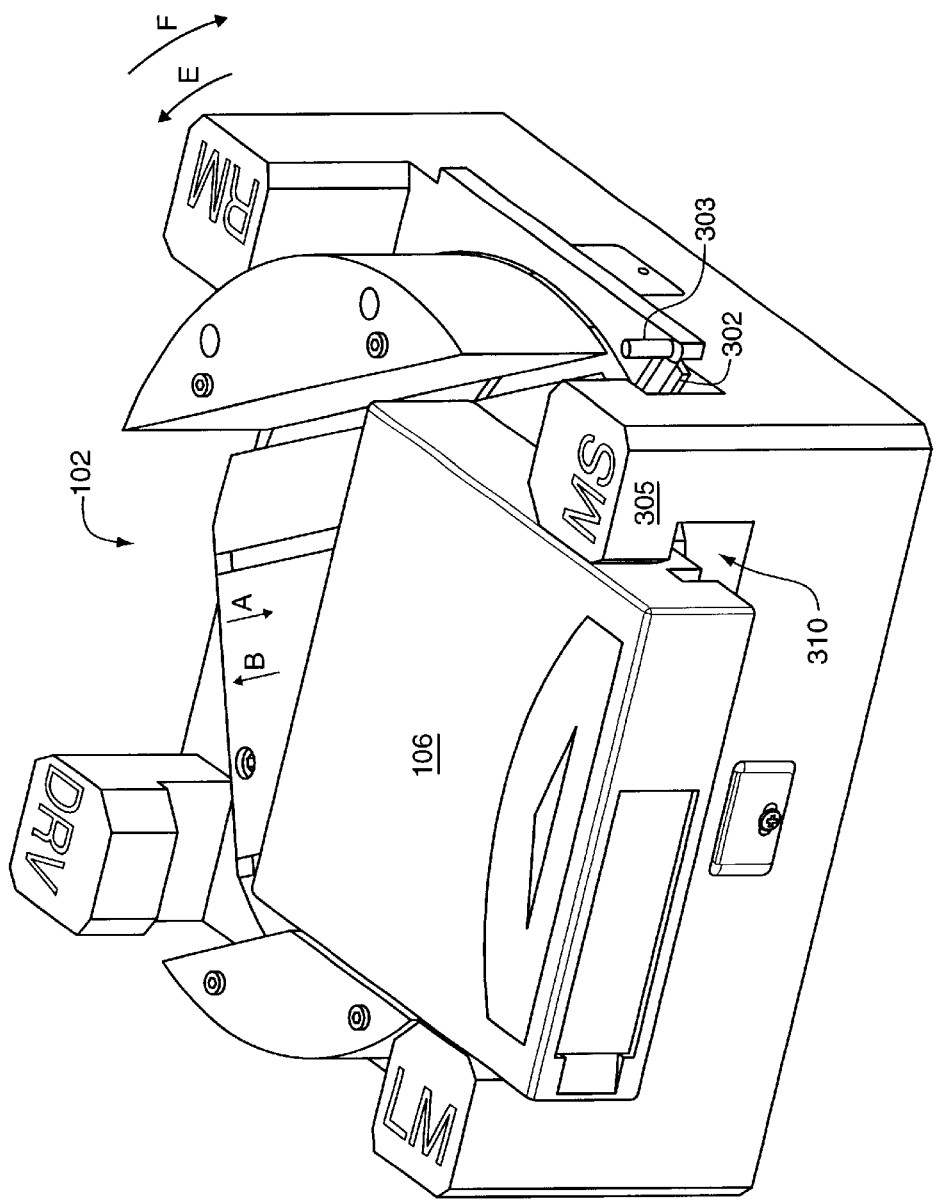
FIG. 8 is another perspective view of the tape cartridge picker used to illustrate the operation of the tape cartridge autoloader/library system.

The translation arm 302 has three primary positions, but as will also become apparent, other positions are used during the exchange of tape cartridges from the tape drive 101, the single cartridge interface 107, and the magazines 103 and 104. The first primary position, shown in FIG. 7, is defined as the home position. In the home position, the turntable 300 is free to rotate regardless of whether the tape cartridge 106 is present in the cavity 316 or absent from the cavity 316. Additionally, the home position is used regardless of whether the tape cartridge 106 is received from the front or the rear of the turntable 300. The second primary position, shown in FIG. 3, is defined as the forward extension position. In the forward extension position, the translation arm 302 is ready to engage the tape cartridge 106 and suck the cartridge 106 in the direction (A) from the tape drive 101, or the magazines 103 and 104 into the cavity 316. The third primary position, shown in FIG. 8, is defined as the reverse extension position. In the reverse extension position, the translation arm 302 is positioned to engage the tape cartridge 106 and suck the cartridge 106 in the direction (C) from the single cartridge interface 107 into the cavity 316.

Figure 4:
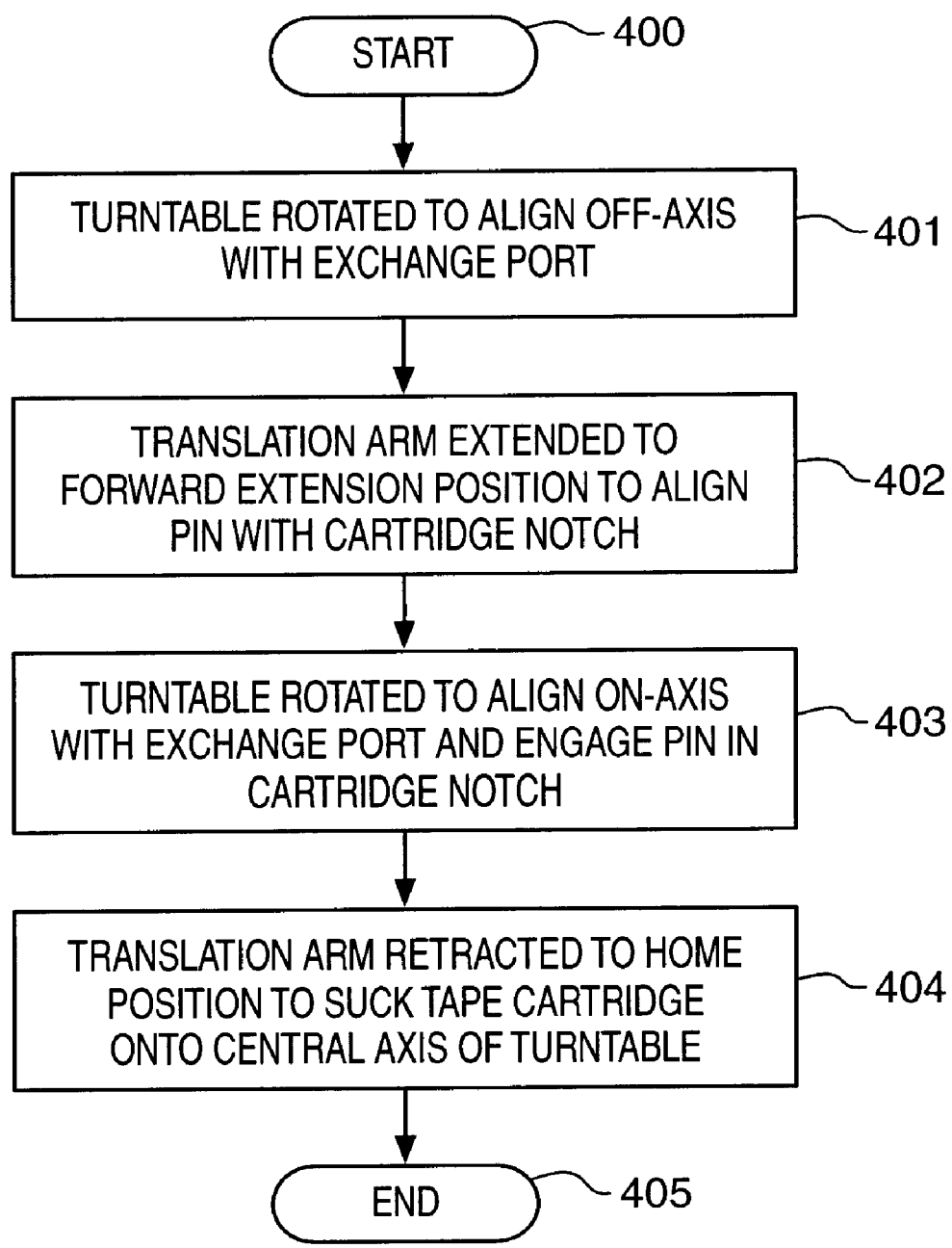
FIG. 4 is a flow chart illustrating an example of the operation of the tape cartridge autoloader/library system.

FIG. 4 is a flow chart illustrating the operation of the autoloader/library system 100 during retrieval of the tape cartridge 106 from the tape cartridge transport magazine 103. Those skilled in the art will appreciate that the operation is substantially identical for retrieval of the tape cartridge 106 from the tape cartridge transport magazine 104 and for retrieval of the tape cartridge 106 following an ejection from the tape drive 101.

When one of the tape cartridge transport magazines, 103 or 104, is inserted into the autoloader/library system 100, the autoloader/library system 100 performs an inventory operation using sensors to determine which carriages, e.g. 113–116, contain tape cartridges and which carriages are empty. In this manner, the autoloader/library system 100 automatically maintains an inventory of loaded tape cartridges during operation. The autoloader/library system 100 also maintains data indicative of the location of specific tape cartridges within the magazines, 103 and 104, so that a desired tape cartridge can be provided to the cartridge picker 102.

Figure 9:
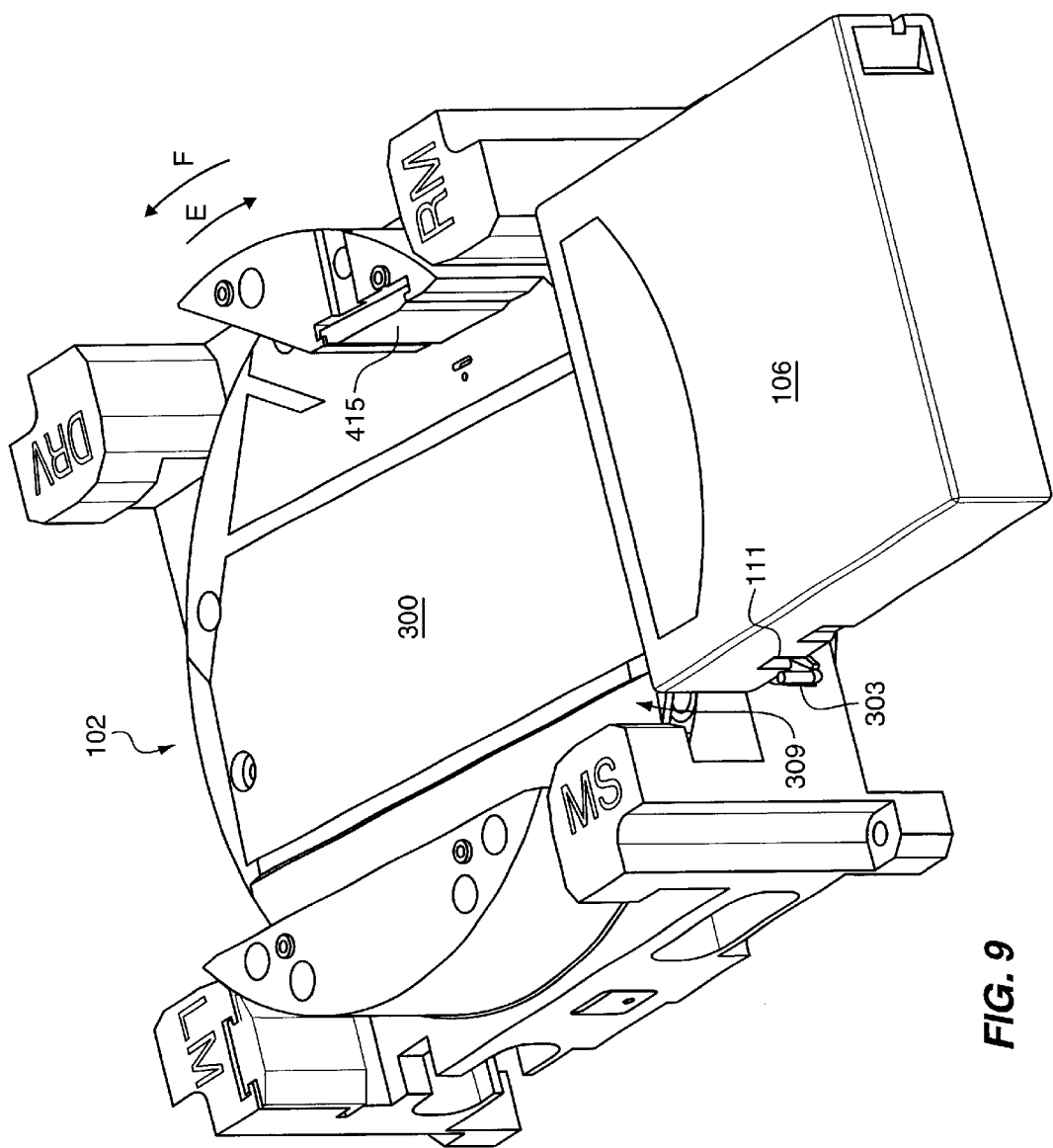
FIG. 9 is another perspective view of the tape cartridge picker used to illustrate the operation of the tape cartridge autoloader/library system.

On FIG. 4 the operation begins at step 400 with the translation arm 302 in the home position of FIG. 7. At step 401, the turntable 300 is rotated to align off-axis with the exchange port 309, as shown in FIG. 9. In the context of the present invention, an off-axis alignment of the turntable 300 is defined as any position of the turntable 300 where either the rear of the turntable 300 or the front of the turntable 300 is not aligned with one of the exchange ports 309–312. Similarly, an on-axis alignment of the turntable 300 is defined as any position of the turntable 300 where either the rear of the turntable 300 or the front of the turntable 300 is aligned with one of the exchange ports 309–312. In this case, the off-axis alignment refers to aligning the front of the turntable 300 approximately three and one half degrees past the exchange port 309 in the direction (E). The off-axis alignment permits extension of the translation arm 302 to the forward extension position without contacting the tape cartridge 106. Alternatively, the off-axis alignment could be any position that permits the translation arm 302 to be extended to the forward extension position without contacting the tape cartridge 106.

Figure 10:
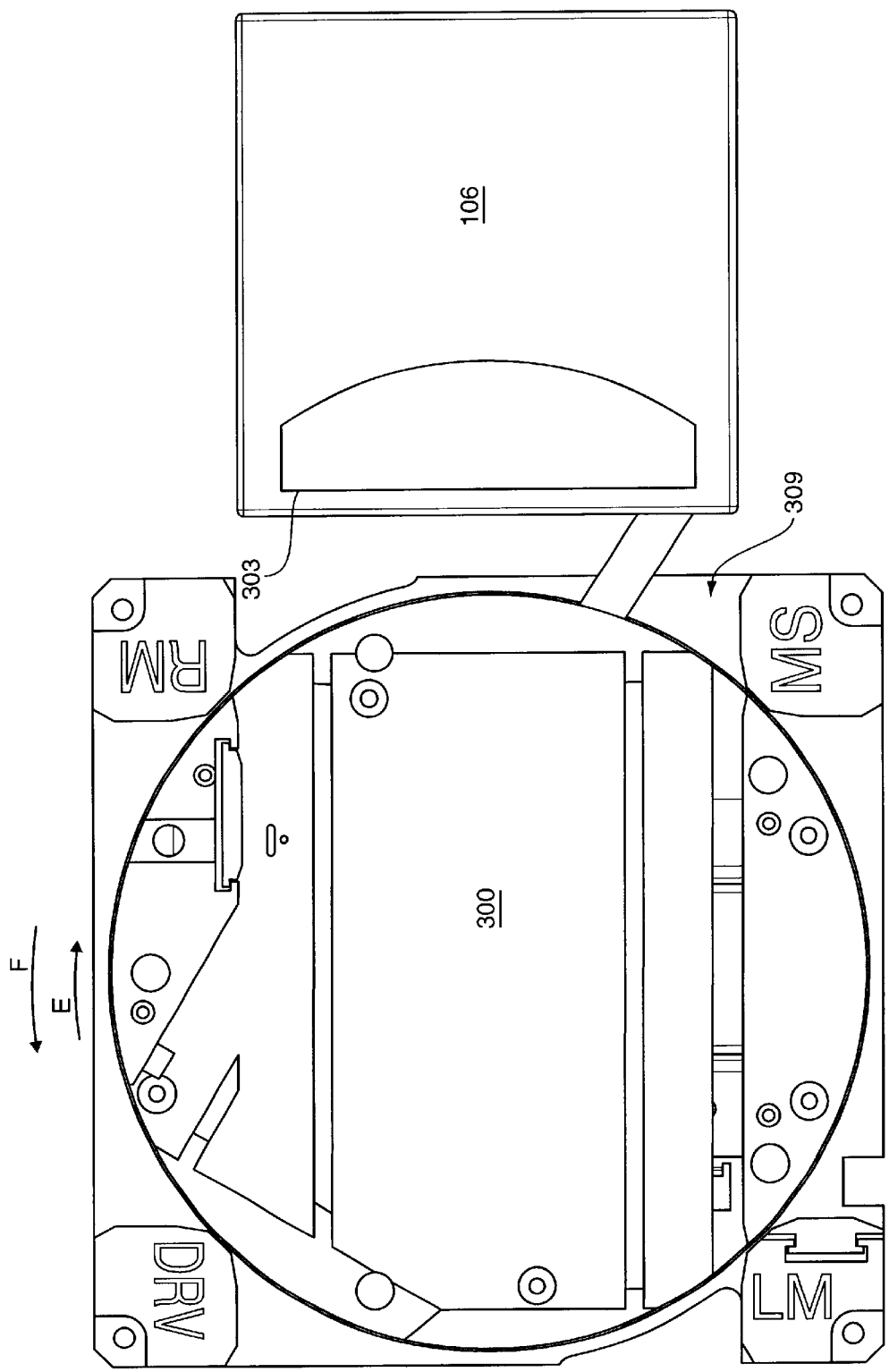
FIG. 10 is another perspective view of the tape cartridge picker used to illustrate the operation of the tape cartridge autoloader/library system.
Figure 11:
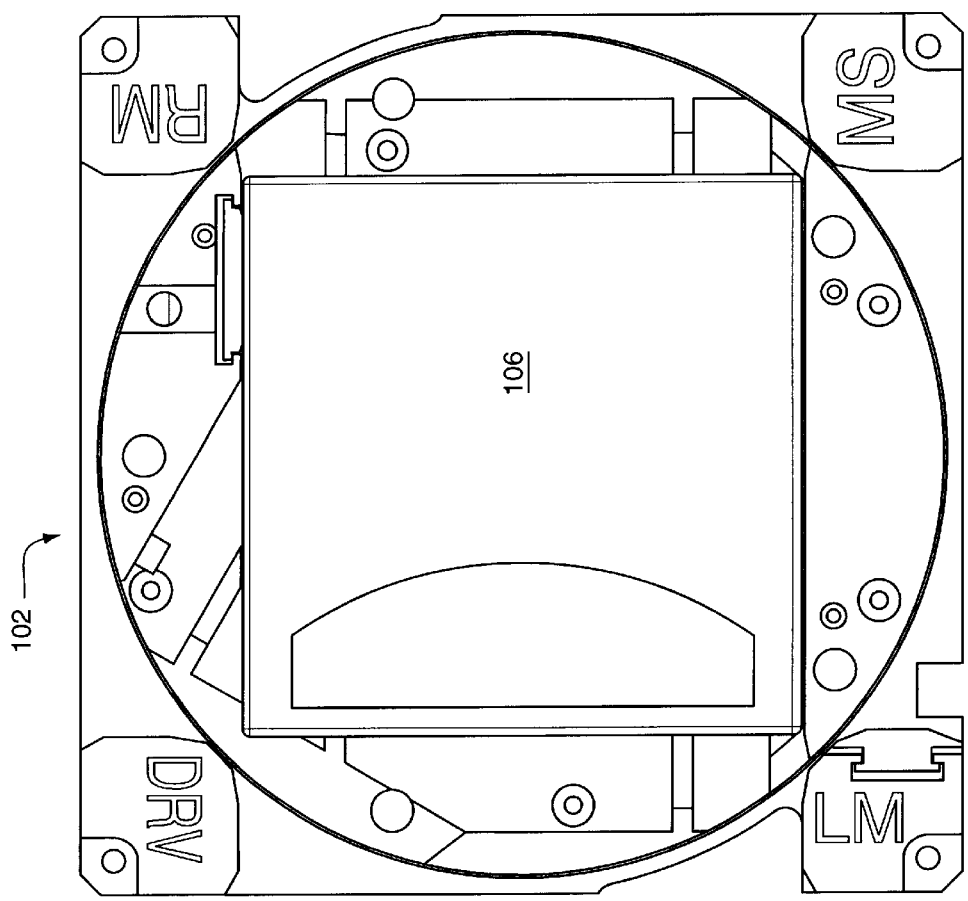
FIG. 11 is another perspective view of the tape cartridge picker used to illustrate the operation of the tape cartridge autoloader/library system.

Substantially simultaneously, the transport magazine 103 transports the carriage 113 containing the desired tape cartridge 106 to the storage location aligned with the cartridge picker 102. At step 402, the translation arm 302 is extended to the forward extension position so that the pin 303 is aligned with the cartridge notch 111 in the tape cartridge 106. At step 403 the turntable is rotated three and one half degrees in the direction (F) to align the front of the turntable 300 on-axis with the exchange port 309 and engage or seat the pin 303 in the cartridge notch 111, as shown in FIG. 10. At step 404, the translation arm 302 is retracted to the home position of FIG. 7 to suck the tape cartridge 106 into the cavity 316 and onto the central axis of the turntable 300, as shown in FIG. 11. The operation ends at step 405. Advantageously, once in this position, the turntable 300 and cartridge 106 may be freely rotated to deliver the tape cartridge 106 to the tape drive 101, the magazine 104, or the single cartridge interface 107.

Figure 5:
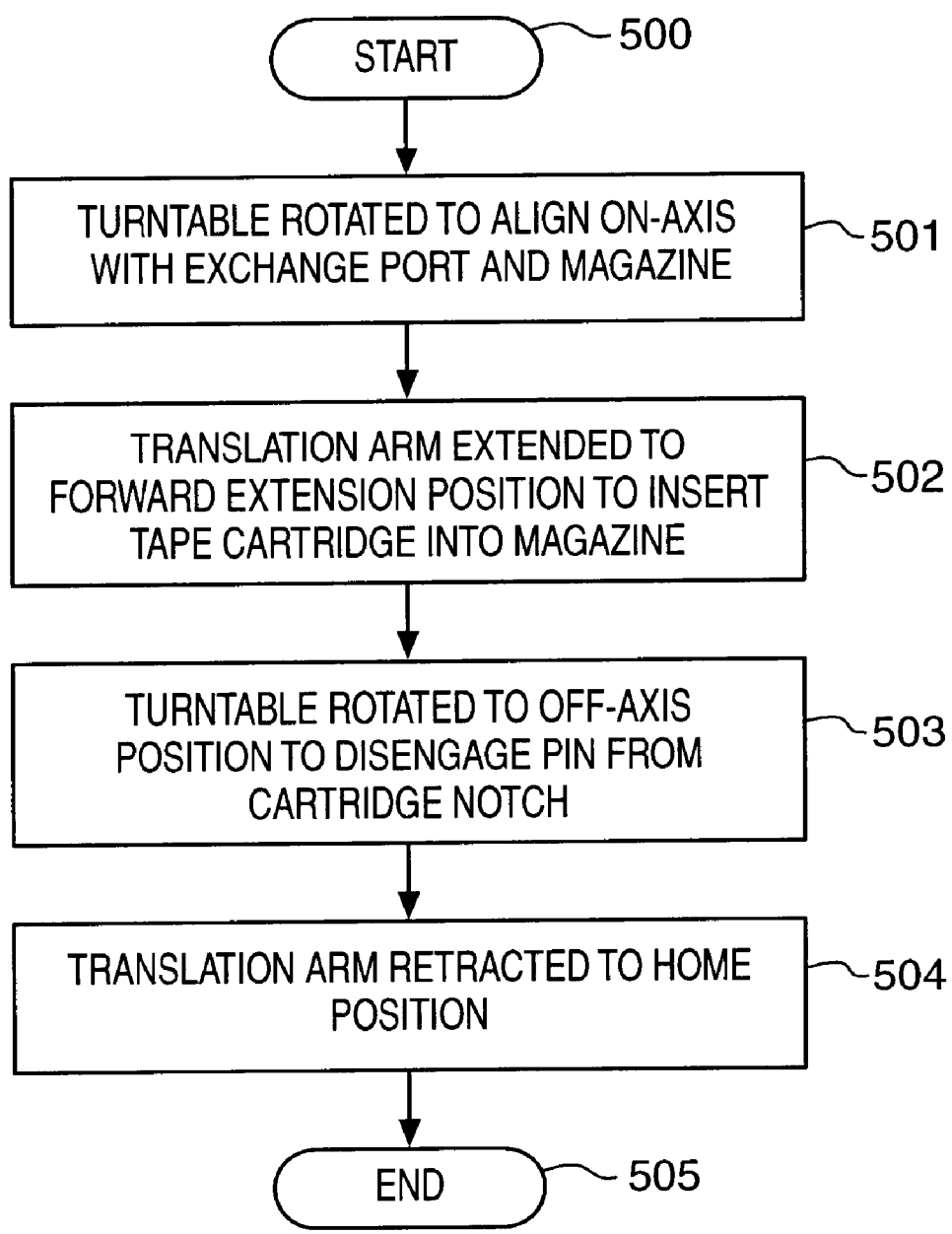
FIG. 5 is a flow chart illustrating another example of the operation of the tape cartridge autoloader/library system.

FIG. 5 is a flow chart illustrating the delivery of the tape cartridge 106 to the tape cartridge transport magazine 104. Those skilled in the art will appreciate that the operation is substantially identical for delivery of the tape cartridge 106 to the tape cartridge transport magazine 103.

On FIG. 5, the operation begins at step 500 with the tape cartridge 106 loaded onto the cartridge picker 102 as described in FIG. 4. At step 501, the turntable 300 is rotated to align the front of the turntable on-axis with the exchange port 311 and the tape cartridge magazine 104. Substantially simultaneously, the transport magazine 104 transports an empty carriage, e.g. 114, to the storage location aligned with the cartridge picker 102. At step 502, the translation arm 302 is extended to the forward extension position to insert the tape cartridge 106 into the carriage 114 in the tape cartridge magazine 104, as exemplified by the position of the cartridge 106 relative to the picker 102 in FIG. 10. At step 503, the turntable 300 is again rotated in the direction (E) to the three and one half degrees off-axis position to disengage the pin 303 from the cartridge notch 111, as exemplified by the position of the cartridge 106 relative to the pin 303 in FIG. 9. At step 504, the translation arm is retracted to the home position of FIG. 7, so that the turntable 300 is free to rotate and perform additional operations. The operation ends at step 505.

Figure 6:
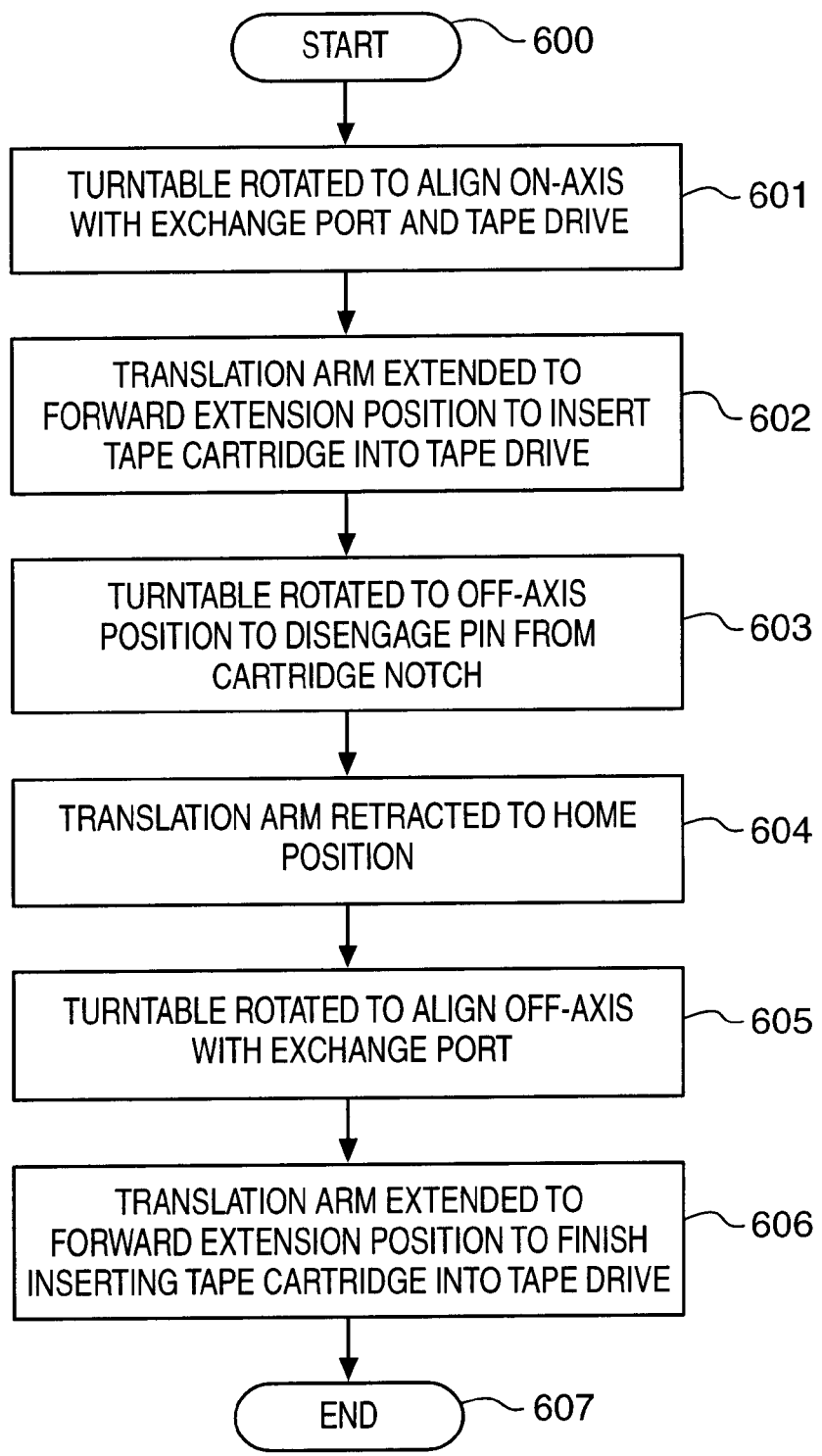
FIG. 6 is a flow chart illustrating another example of the operation of the tape cartridge autoloader/library system.
Figure 12:
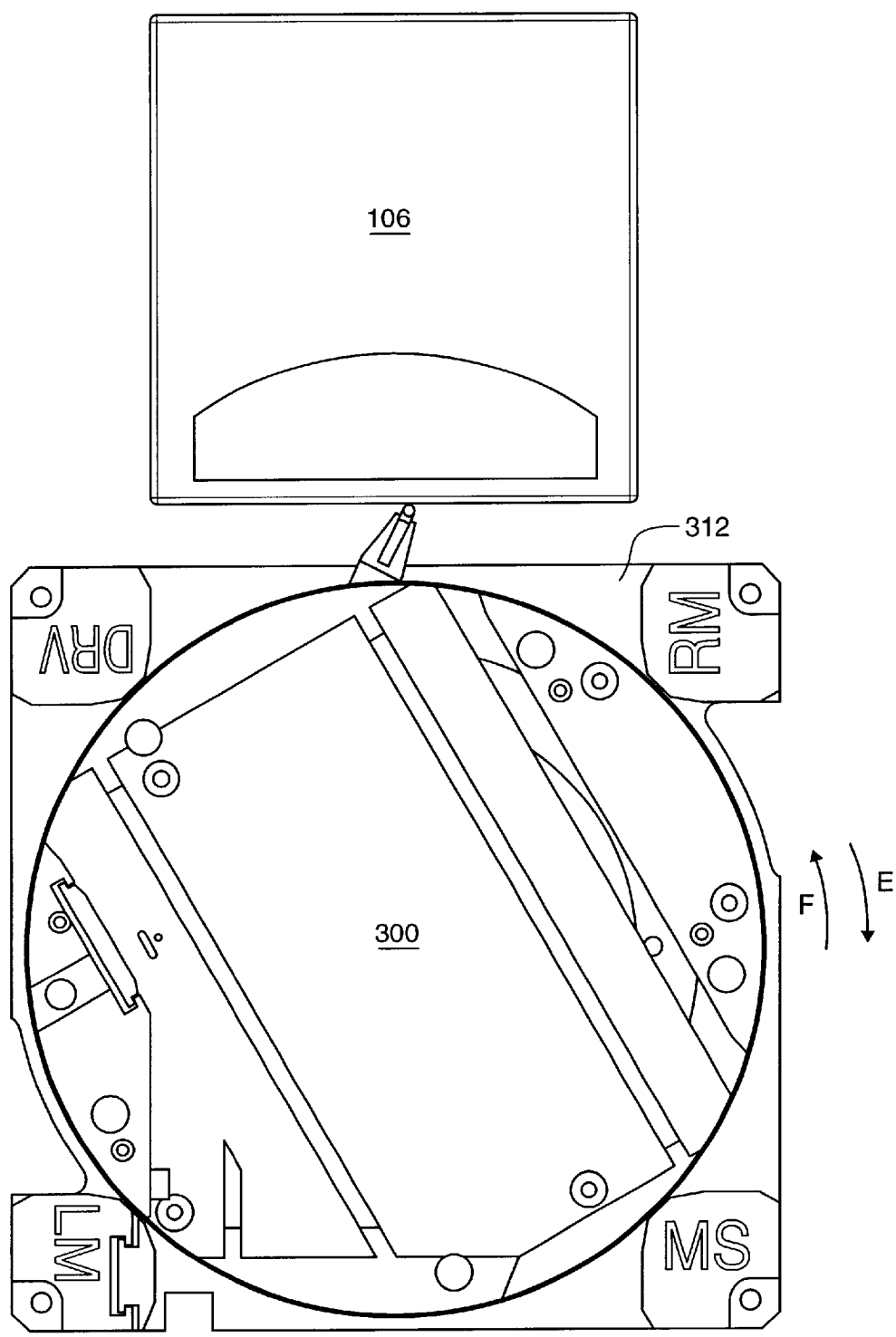
FIG. 12 is another perspective view of the tape cartridge picker used to illustrate the operation of the tape cartridge autoloader/library system.

FIG. 6 is a flow chart illustrating the delivery of the tape cartridge 106 to the tape drive 101. On FIG. 6, the operation begins at step 600 with the tape cartridge 106 loaded onto the cartridge picker as described in FIG. 4. At step 601, the turntable 300 is rotated to align the front of the turntable 300 on-axis with the exchange port 312 and the tape drive 101. At step 602, the translation arm 302 is extended to the forward extension position to insert the tape cartridge 106 into the tape drive 101, as exemplified by the position of the cartridge 106 relative to the picker 102 in FIG. 10. Those skilled in the art will also appreciate that the tape cartridge 106 is only partially inserted into the tape drive 101 at this point so that the translation arm 302 is prevented from contacting the tape drive 101. At step 603, the turntable 300 is again rotated in the direction (E) to the three and one half degrees off-axis position to disengage the pin 303 from the cartridge notch 111, as exemplified by the position of the cartridge 106 relative to the pin 303 in FIG. 9. At step 604, the translation arm 302 is retracted to the home position of FIG. 7, so that the turntable 300 is free to rotate. Alternatively, the translation arm 302 may only be retracted far enough for the picker 102 to rotate without interference from the cartridge 106. At step 605, the turntable is rotated in direction (F) so that it is aligned approximately thirty degrees off-axis with the exchange port 312, and the translation arm 302 is behind the tape cartridge 106, as shown in FIG. 12. It should be noted that the thirty-degree rotation is not essential but rather advantageously adds mechanical advantage and permits the translation arm 302 to push on the center of the cartridge 106. At step 606, the translation arm is again extended to the forward extension position to finish inserting the tape cartridge 106 into the tape drive 101. Those skilled in the art will appreciate that because of the thirty-degree off-axis alignment with the exchange port 312, the forward extension of the translation arm 302 is now able to complete the insertion of the tape cartridge 106 into the tape drive 101. The operation ends at step 607.

Figure 18:
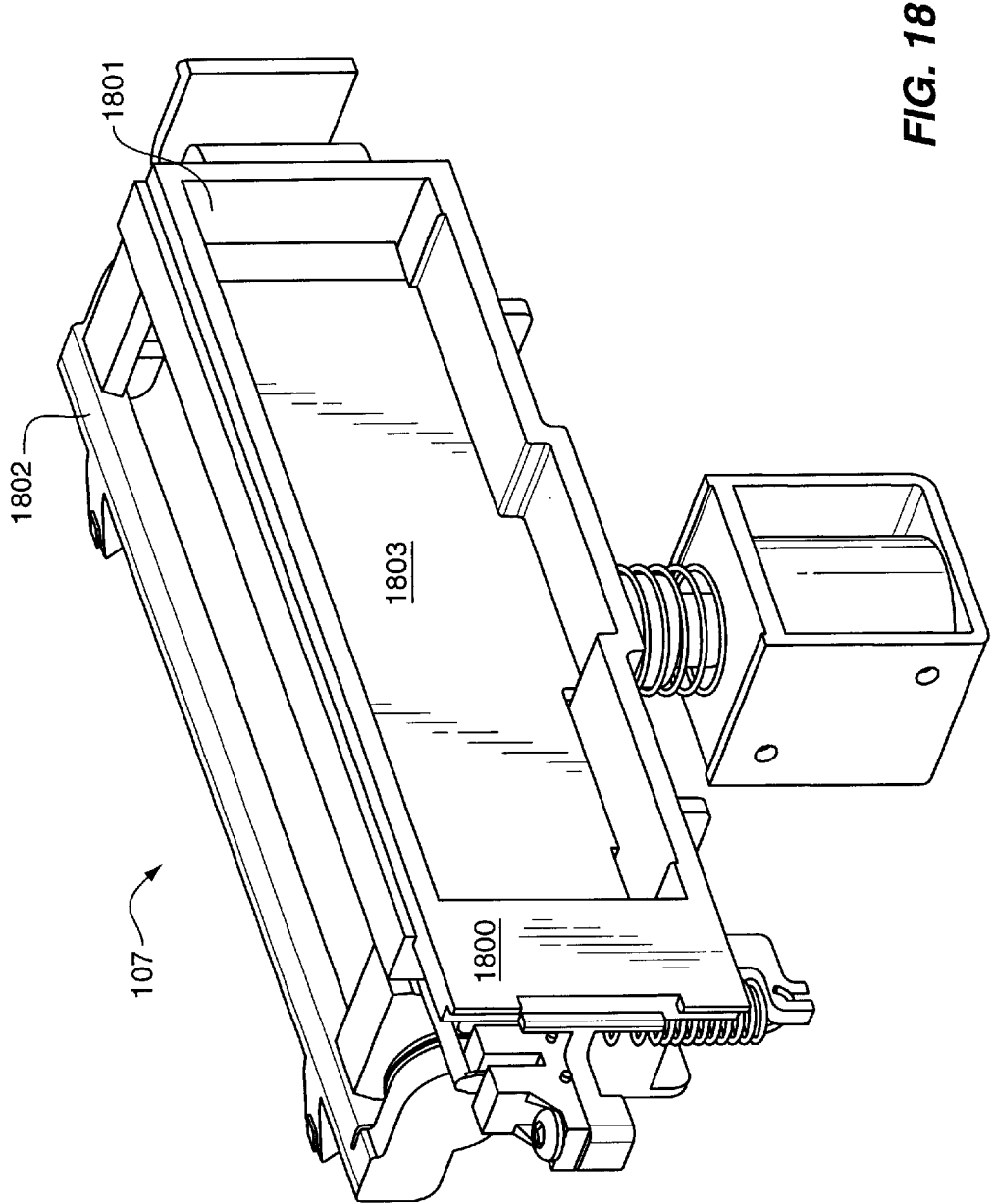
FIG. 18 is a front perspective view of the single cartridge interface according to the present invention.
Figure 19:
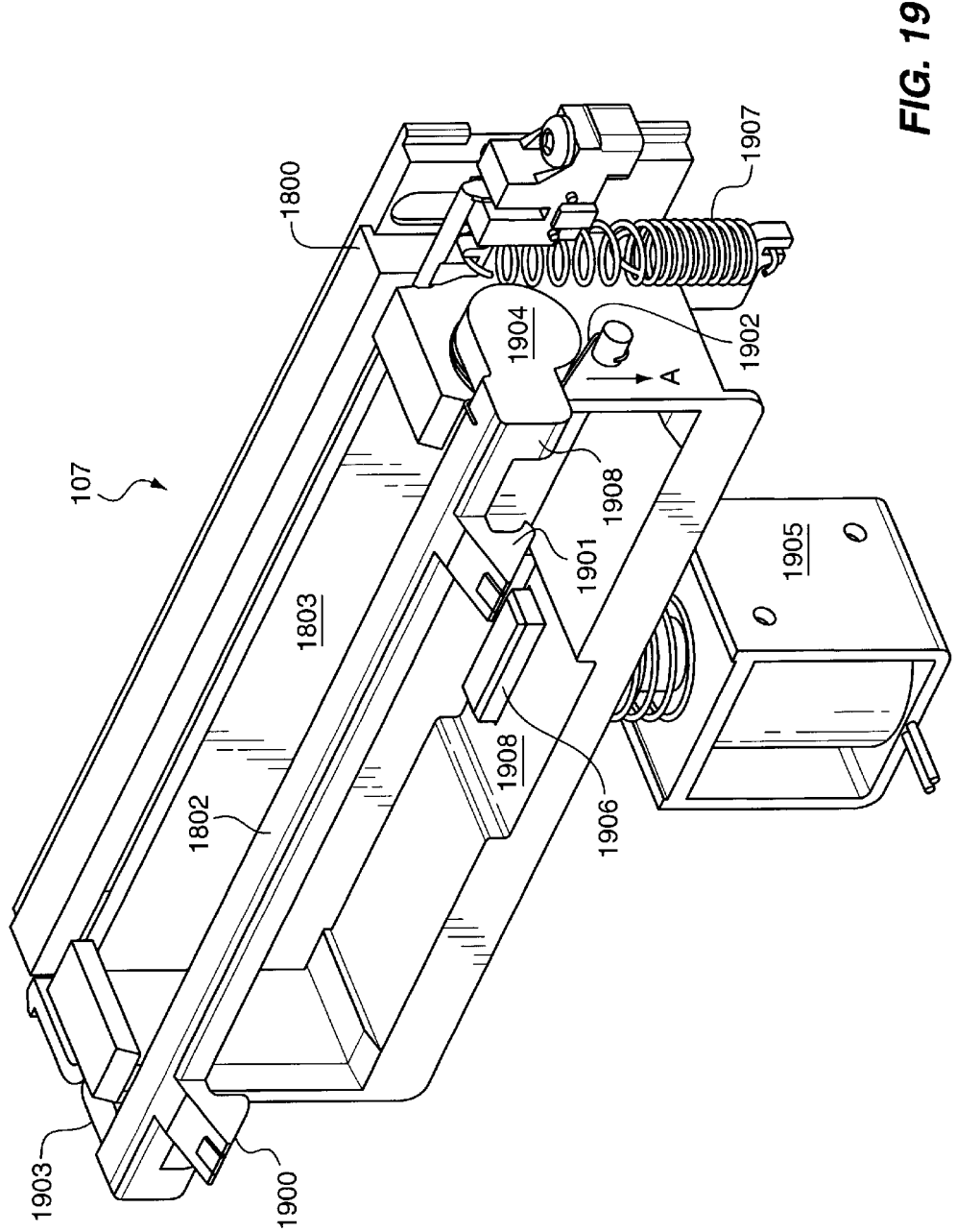
FIG. 19 is a rear perspective view of the single cartridge interface according to the present invention.

Single Cartridge Interface—FIGS. 18 and 19

The primary components of the single cartridge interface 107 are a frame 1800, a cartridge stop link 1802, and a door 1803. The door 1803 is connected within a central aperture 1801 in the frame 1800 and pivots both outward and inward as a function of whether the tape cartridge 106 is being ejected from the single cartridge interface 107 or inserted into the single cartridge interface 107 by an operator. When the tape cartridge 106 is inserted into the single cartridge interface 107, the door 1803 pivots inward to engage the cartridge stop link 1802 and raise the cartridge stop link 1802 to permit the tape cartridge 106 to pass under the cartridge stop link 1802 and into position for retrieval by the cartridge picker 102. When the tape cartridge 106 is ejected from the single cartridge interface 107, the door 1803 pivots outward as it is contacted by the tape cartridge 106.

Referring to FIG. 19, the cartridge stop link 1802 includes a pair of latch members, 1900 and 1901. As will become apparent from the following description, the latch members, 1900 and 1901, prevent the tape cartridge 106 from being reinserted into the single cartridge interface 107 following an ejection operation. The cartridge stop link 1802 is configured to pivot about its ends, 1903 and 1904, when it is contacted by the door 1803, but also includes a spring 1902 that biases the cartridge stop link 1802 in the direction A against a stop 1908 integrally formed in frame 1800 when not engaged by the door 1803.

The single cartridge interface 107 also includes a solenoid 1905 that controls a doorstop 1906. The doorstop 1906 prevents the door 1803 from pivoting inward and allowing the insertion of the tape cartridge 106 when the cartridge picker 102 is not in position to receive the tape cartridge 106 from the single cartridge interface 107. A spring 1907 biases the door 1803 against the doorstop 1906 in the closed position when the cartridge 106 is not present in the single cartridge interface 107. Advantageously, the doorstop 1906 is located in a recessed portion 1908 so that the doorstop 1906 is only retracted during the insertion of the tape cartridge 106 by an operator. During an ejection from the single cartridge interface 107, the tape cartridge 106 passes over the recessed portion 1908 without interference from the doorstop 1906.

Figure 20:
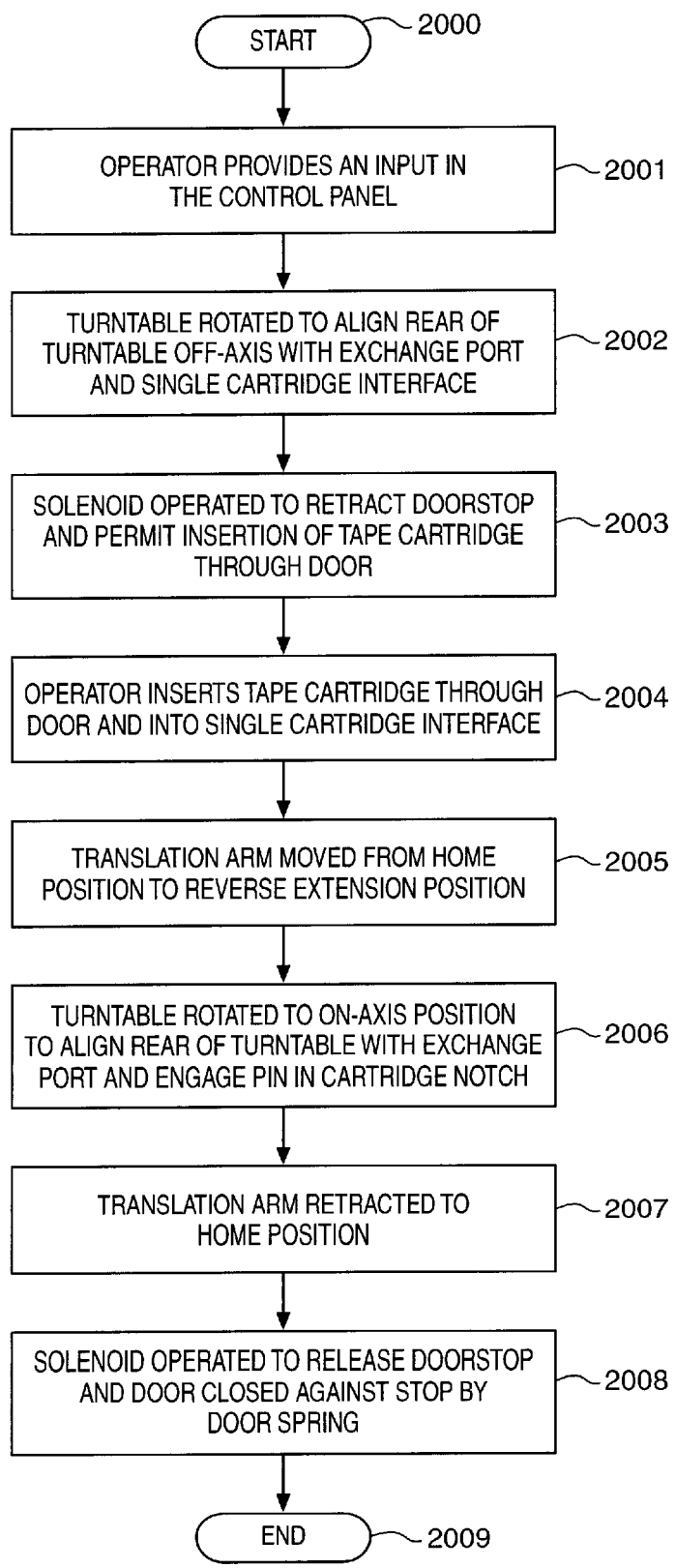
FIG. 20 is a flow chart illustrating another example of the operation of the tape cartridge autoloader/library system.
Figure 22:
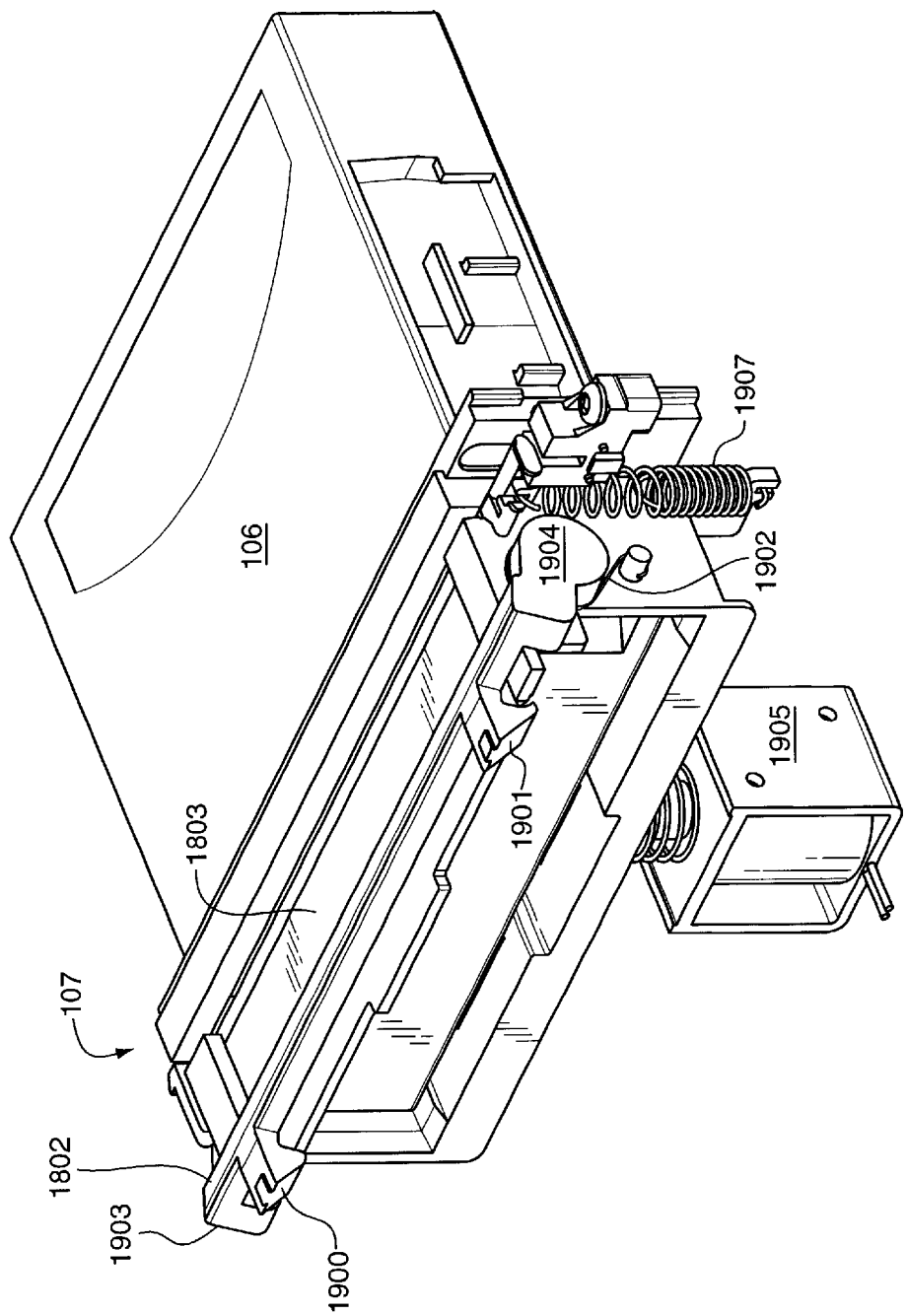
FIG. 22 is a perspective view of the single cartridge interface receiving a tape cartridge from an operator.

FIG. 20 is a flow chart illustrating the receipt of the tape cartridge 106 in the single cartridge interface 107 from an operator. On FIG. 20, the operation begins at step 2000. At step 2001, the operator provides an input in the control panel 105. The input indicates to the autoloader/library system that the tape cartridge 106 needs to be received from the single cartridge interface 107. At step 2002, the turntable 300 is rotated in direction (E) to align the rear of the turntable 300 approximately thirty-degrees off-axis with the exchange port 310 and the single cartridge interface 107, as shown in FIG. 7. It should be noted that at step 2002, the translation arm 302 is in the home position and the wall 315 is aligned with the column 306. At step 2003, the solenoid 1905 is operated to retract the doorstop 1906 to permit insertion of the tape cartridge 106 through the door 1803. At step 2004, the operator inserts the tape cartridge 106 through the door 1803 and into the single cartridge interface 107. During insertion, the door 1803 pivots inward and engages the cartridge stop link 1802 raising the cartridge stop link 1802 slightly to permit the tape cartridge 106 to pass under the latch members, 1900 and 1901, as illustrated by FIG. 22.

Figure 13:
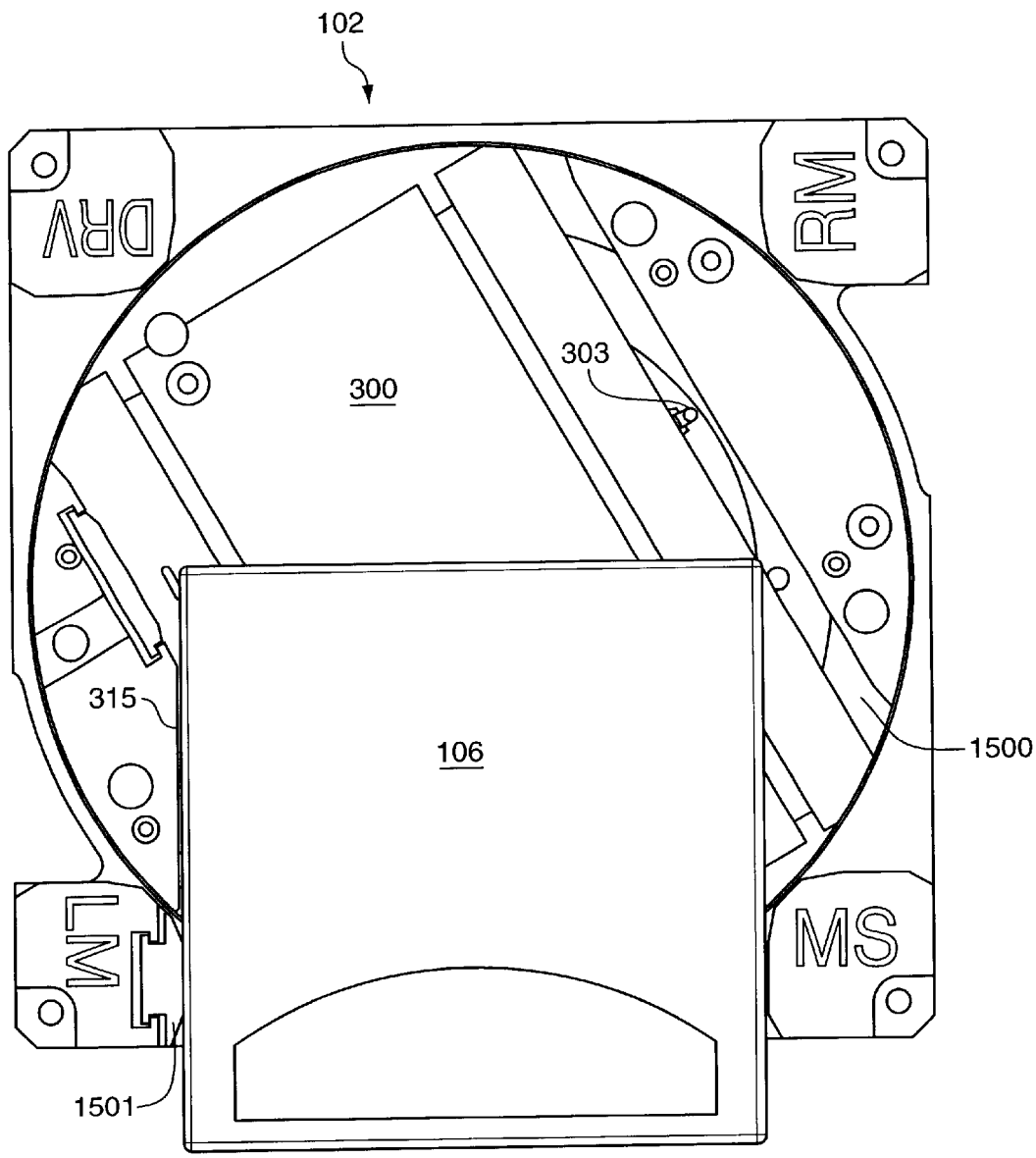
FIG. 13 is another perspective view of the tape cartridge picker used to illustrate the operation of the tape cartridge autoloader/library system.

Referring to FIG. 13 the flex wall 1501 operates to guide the tape cartridge 106 into the cavity 300 during insertion. Specifically, the flex wall 1501 prevents the tape cartridge 106 from rotating counter clockwise into the wall 315 and jamming. As the tape cartridge 106 is inserted into the single cartridge interface 107, a key in the wall 315, engages a conventional slot defined in the side of the tape cartridge 106. Advantageously, the key only permits the tape cartridge 106 to be inserted into the single cartridge interface 107 in one orientation.

Figure 14:
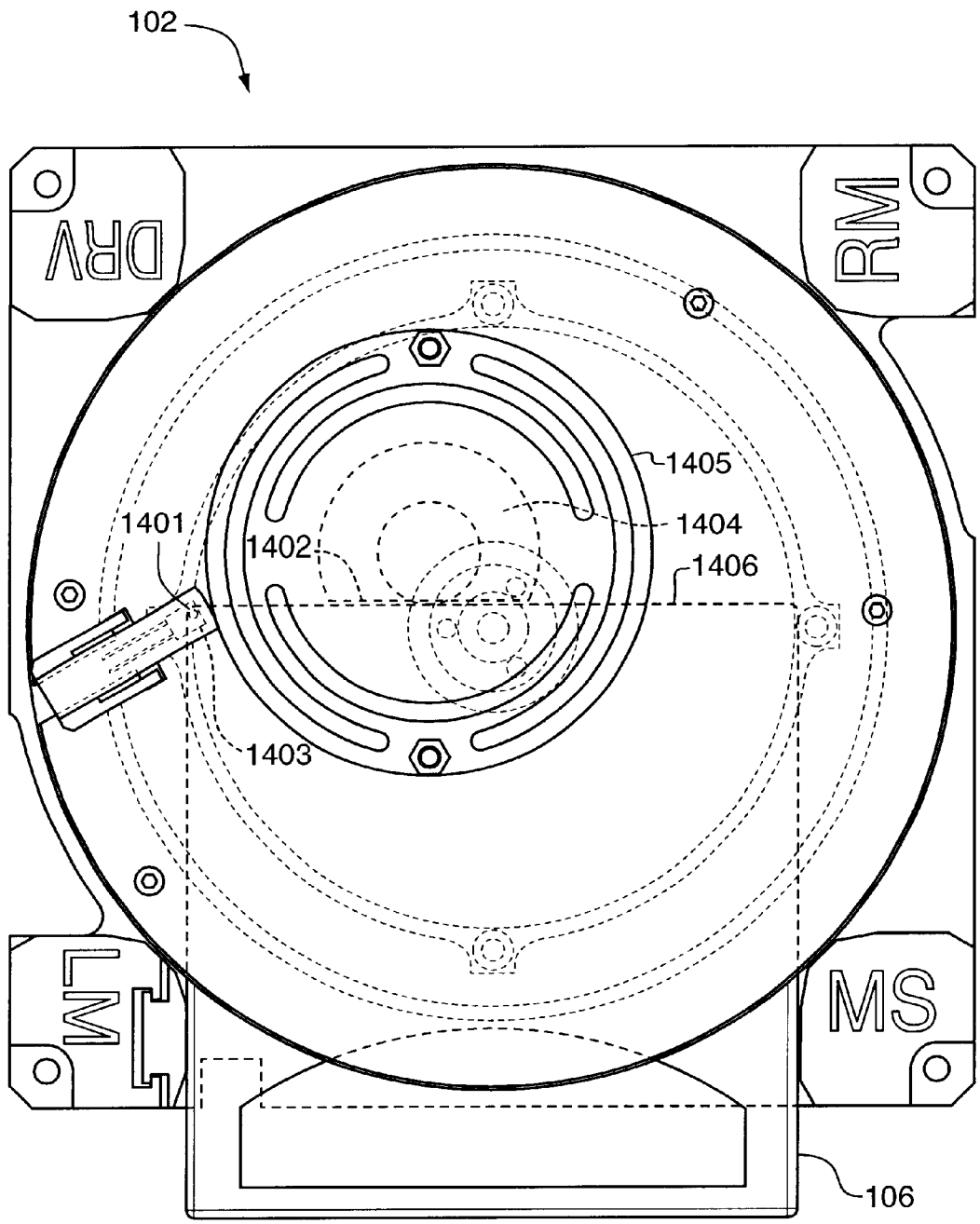
FIG. 14 is another perspective view of the tape cartridge picker used to illustrate the operation of the tape cartridge autoloader/library system.

Referring to FIG. 14, a cartridge stop/compression pad 1405 located in the top of the picker 102 stops the insertion of the tape cartridge 106 when the face 1406 of the tape cartridge 106 contacts a planer portion 1402 of the cartridge stop/compression pad 1405. In the stopped position, the tape cartridge 106 is positioned so that pin 303 will align with and engage the cartridge notch 111 when the turntable 300 is rotated. Advantageously, the cartridge stop/compression pad 1405 only functions to stop the tape cartridge 106 when the turntable 300 is in the position of FIGS. 13 and 14. In all other positions, the tape cartridge 106 contacts a beveled portion 1404 of the cartridge stop/compression pad 1405 causing the cartridge stop/compression pad 1405 to function as a compression pad and expand vertically upward to permit the cartridge 106 to be fully received into the cavity 316. Thus, when the cartridge 106 is retrieved from the transport magazines, 103 and 104, or the tape drive 101, the cartridge picker 102 is able to suck the cartridge 106 past the cartridge stop/compression pad 1405 as the compression pad portion of the cartridge stop/compression pad 1405 expands vertically upward.

In the stopped position of FIG. 14, the corner 1401 of the tape cartridge 106 blocks an emitter 1403 portion of a cartridge present sensor to indicate a cartridge present condition. This permits the cartridge picker 102 to automatically sense the cartridge 106 during insertion from the single cartridge interface 107 and begin loading the cartridge 106 into the cavity 316. Alternatively, the loading could begin in response to an input received in the control panel 105 from the operator.

Figure 15:
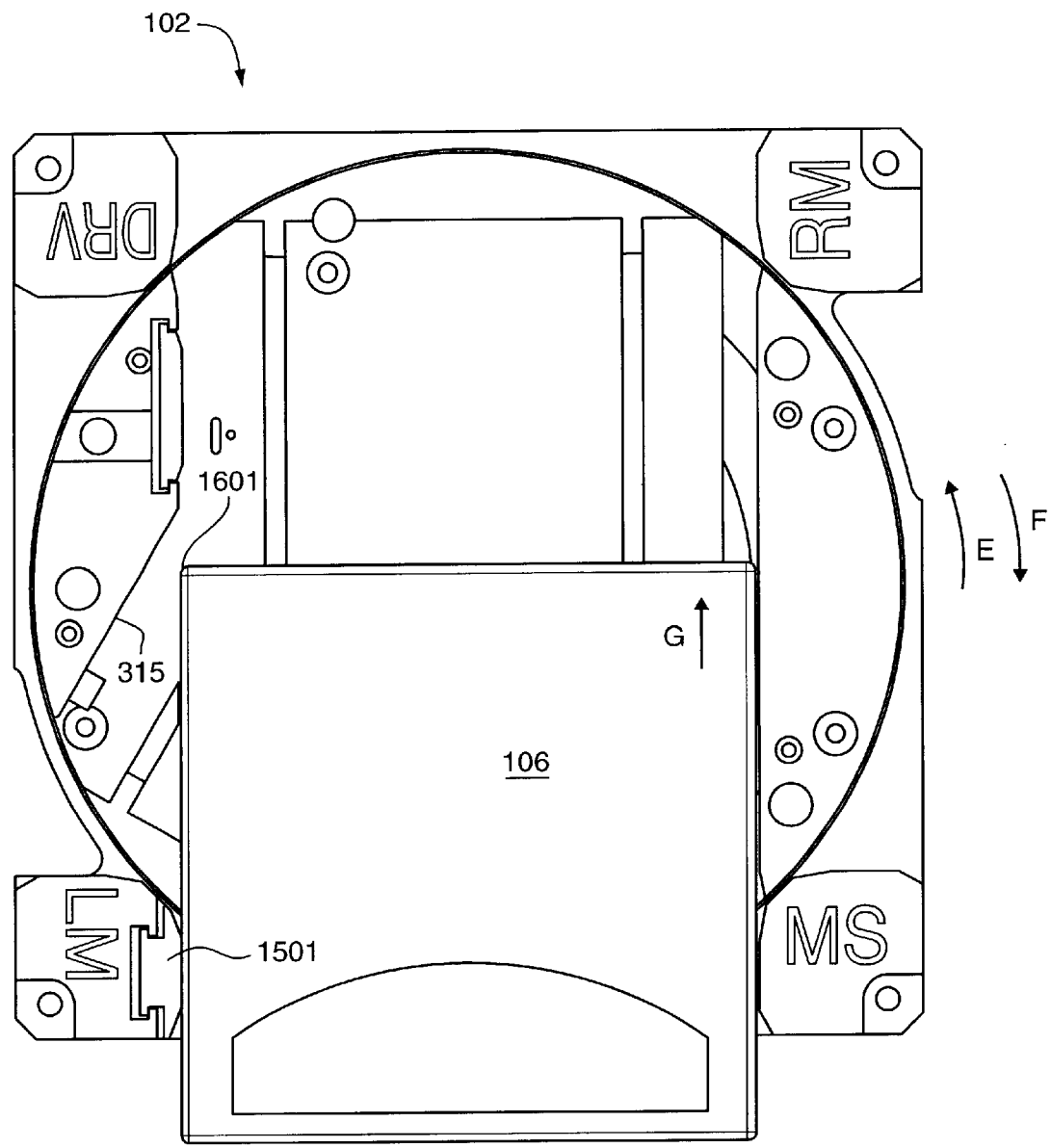
FIG. 15 is another perspective view of the tape cartridge picker used to illustrate the operation of the tape cartridge autoloader/library system.

At step 2005, the translation arm is moved from the home position of FIG. 7 to the reverse extension position of FIG. 8. At step 2006, the turntable 300 is rotated thirty degrees in the direction (F) to the on-axis position to align the rear of the turntable 300 with the exchange port 310 and engage or seat the pin 303 in the cartridge notch 111, as shown in FIG. 15. At step 2007, the translation arm 302 is retracted to the home position of FIG. 7, to suck the tape cartridge 106 into the cavity 316 and onto the central axis of the turntable 300. Substantially simultaneously, at step 2008, the solenoid 1905 is again operated to release the doorstop 1906 and the door 1803 is closed against the stop 1906 by the door spring 1907. The operation ends at step 2009. Advantageously, the doorstop 1906 prevents additional tape cartridges from being inserted into the single cartridge interface 107 until the picker 102 is again in position and ready to receive another tape cartridge.

Figure 16:
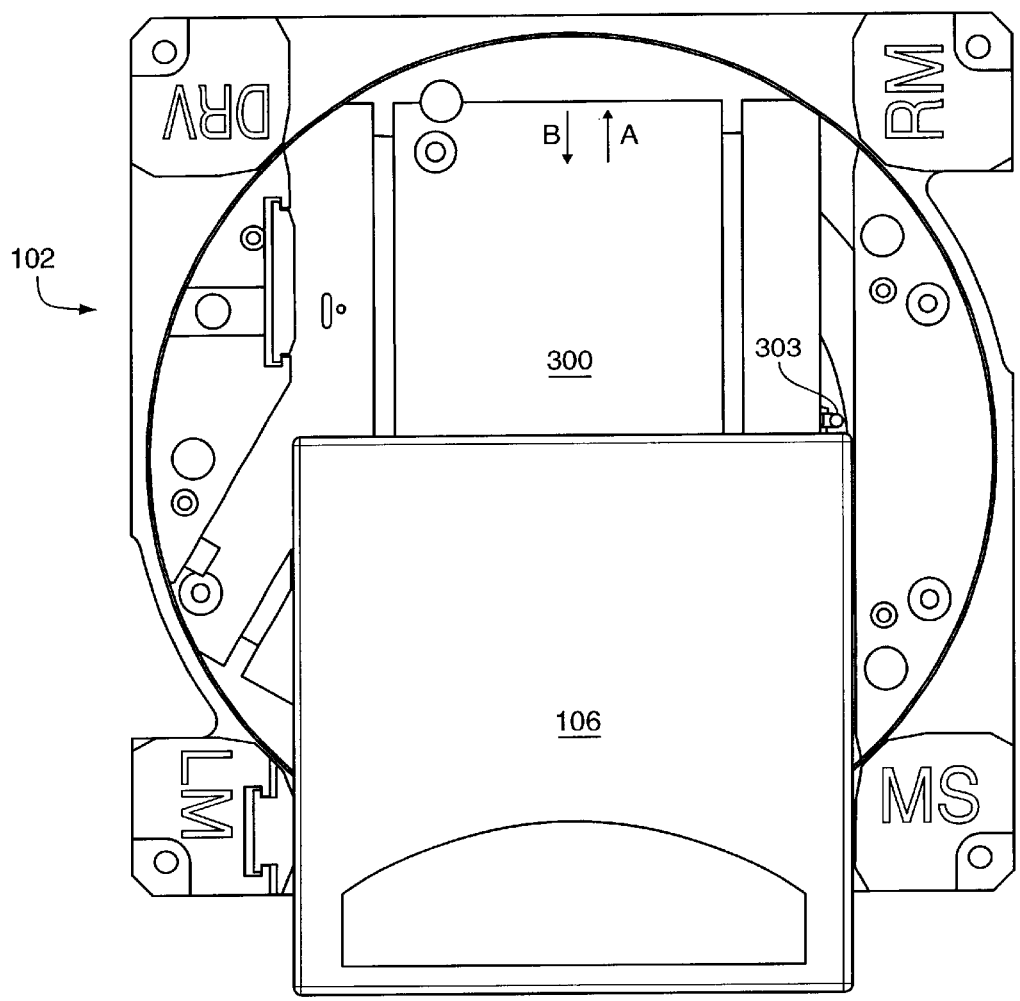
FIG. 16 is another perspective view of the tape cartridge picker used to illustrate the operation of the tape cartridge autoloader/library system.
Figure 17:
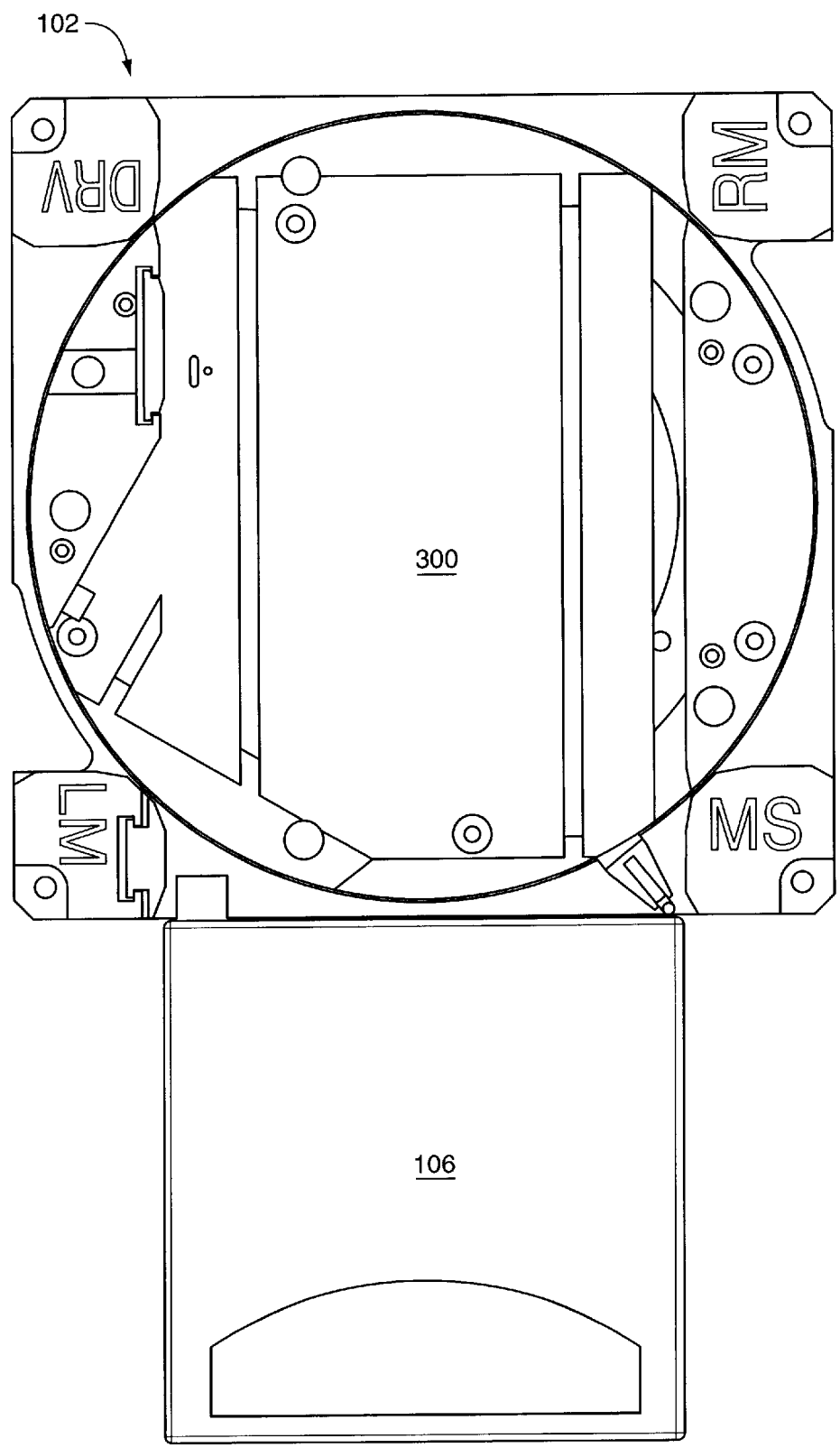
FIG. 17 is another perspective view of the tape cartridge picker used to illustrate the operation of the tape cartridge autoloader/library system.
Figure 21:
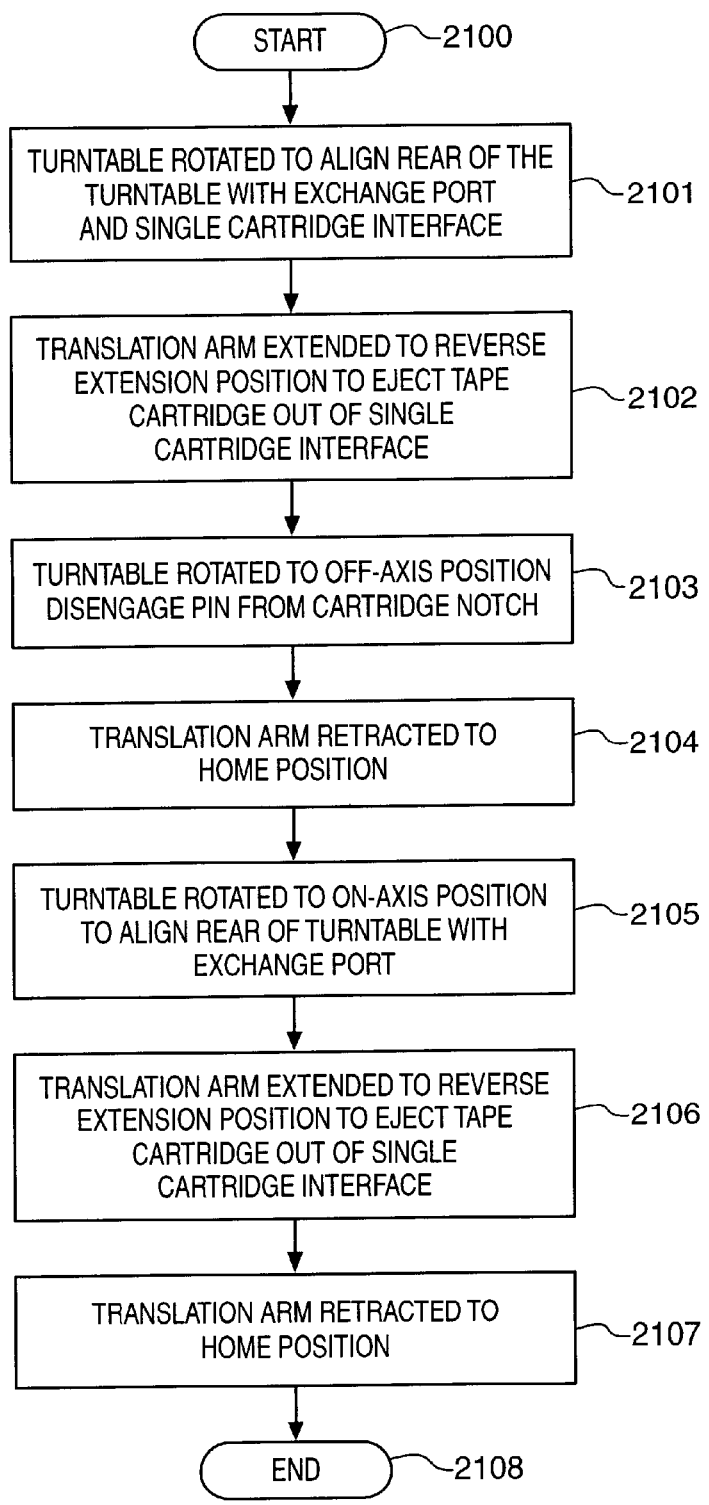
FIG. 21 is a flow chart illustrating another example of the operation of the tape cartridge autoloader/library system.
Figure 23:
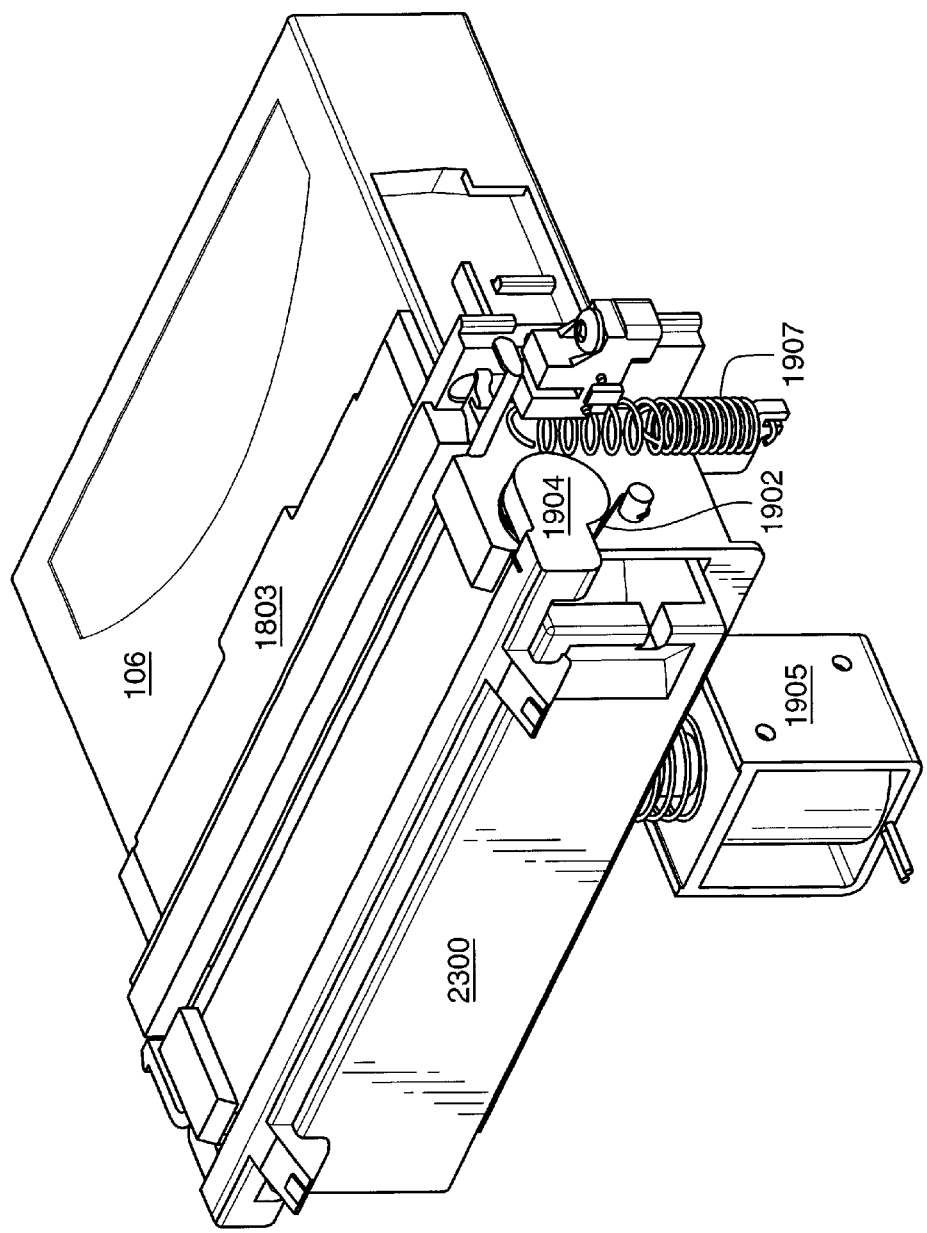
FIG. 23 is a perspective view of the single cartridge interface receiving a tape cartridge from the cartridge picker.

FIG. 21 is a flow chart illustrating the delivery of the tape cartridge 106 to the single cartridge interface 107. On FIG. 21, the operation begins at step 2100 with the tape cartridge 106 loaded onto the cartridge picker 102 as described in reference to either FIG. 4. At step 2101, the turntable 300 is rotated to align the rear of the turntable 300 on-axis with the exchange port 310 and the single cartridge interface 107. At step 2102, the translation arm 302 is extended to the reverse extension position to eject the tape cartridge 106 out of the single cartridge interface 107 as exemplified by the position of the cartridge 106 and turntable 300 in FIG. 15. At step 2103, the turntable 300 is again rotated in the direction (E) to the thirty-degree off-axis position to disengage the pin 303 from the cartridge notch 111, as shown in FIG. 8. At step 2104, the translation arm 302 is retracted to a position behind the cartridge 106 as shown in FIG. 13. At step 2105, the turntable 300 is rotated in the direction (F) to the on-axis position so that the rear of the turntable is aligned with the exchange port 310 and the translation arm 302 is behind the tape cartridge 106, as shown in FIG. 16. At step 2106, the translation arm 302 is again extended to a reverse extension, as shown in FIG. 17, to eject the tape cartridge 106 further out of the single cartridge interface 107 so that the cartridge 106 is in the frame 1800 of the single cartridge interface 107 as shown in FIG. 23. During the ejection, the tape cartridge 106 contacts the beveled portion of the latches, 1900 and 1901, causing the cartridge stop link 1802 to pivot upward and the latches, 1900 and 1901, to slide across the top of the tape cartridge 106. As the cartridge 106 clears the cartridge stop link 1802, the spring 1902 biases the cartridge stop link 1802 in the direction A to secure the latch members, 1900 and 1901, onto the back 2300 of the cartridge 106 as shown in FIG. 23. Advantageously, in this position, the cartridge stop link 1802 prevents the reinsertion of the tape cartridge 106 back into the single cartridge interface 107. The cartridge 106 can only be reinserted by removing the cartridge 106 from the single cartridge interface 107 and repeating the steps of FIG. 20 to recall the picker 102 and release the doorstop 1906. Also advantageously, the cartridge 106 remains in the single cartridge interface 107 for retrieval by the operator and the cartridge picker 102 is free to perform additional operations in the autoloader/library system 100. It should be noted that during the ejection, the doorstop 1906 in the recessed portion 1908 does not interfere with the tape cartridge 106. At step 2107 the translation arm is retracted to home position of FIG. 7 and the operation ends at step 2108.

Figure 24:
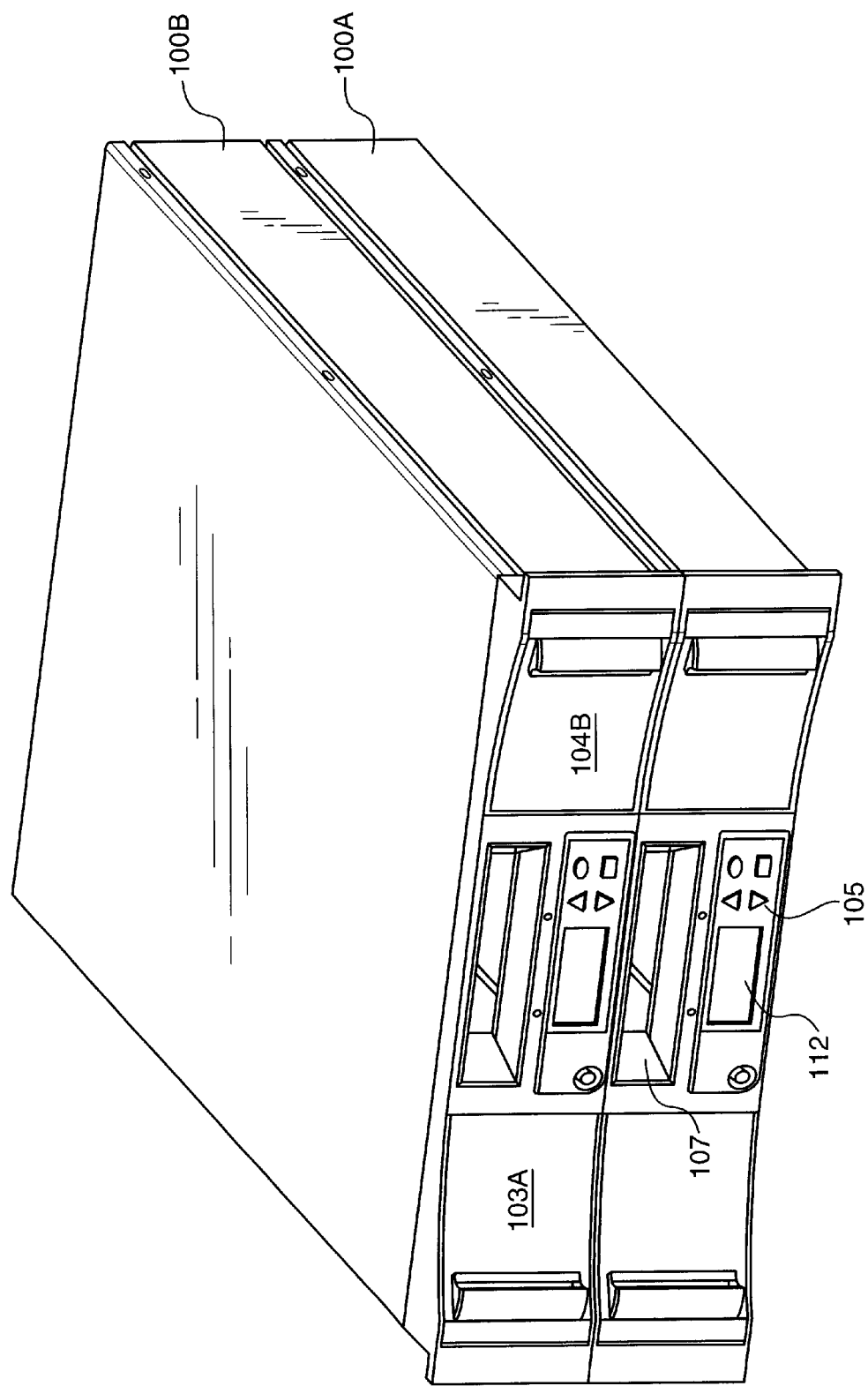
FIG. 24 illustrates a stacked configuration of the autoloader/library system configured with the single cartridge interface.

Expansion of Tape Autoloader/Library Systems—FIG. 24

FIG. 24 illustrates multiple autoloader library systems in a stacked configuration. Those skilled in the art will appreciate that an infinite number of autoloader library systems could be stacked although only library systems 100(*a*) and 100(*b*) are shown on FIG. 24 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(*a*) and 100(*b*) can share individual tape cartridges, e.g. 106, to provide efficient load balancing and performance between the coupled autoloader/library systems. The coupled autoloader/library systems 100(*a*) and 100(*b*) could each include a cartridge picker 102, tape cartridge transport magazines, 103 and 104, a tape drive 101, and a single cartridge interface 107, or could share elements such as the cartridge picker 102, the single cartridge interface and/or the tape drive 101. Alternatively, a single cartridge picker 102 configured with an elevator mechanism could serve both autoloader/library systems 100(*a*) and 100(*b*). In addition, the coupled autoloader/library systems 100(*a*) and 100(*b*) could each include an individual control panel 105 and interface 112 or could share a single control panel, e.g. 105, and interface, e.g. 112. In the case where the library systems, e.g. 100, are coupled, the cartridge picker 102 is configured to not only rotate but is also configured to elevate within the multiple library systems, 100(*a*) and 100(*b*), to access magazines, 103(*a*) and 104(*b*).

In another example, the library systems, 100(*a*) and 100(*b*), could share the single cartridge interface 107. In this case the single cartridge interface 107 is configured with an elevator mechanism to transport the single cartridge interface 107 in the vertical direction between the multiple library systems, 100(*a*) and 100(*b*). Operationally, the cartridge picker 102 in the system 100(*a*) could pass tape cartridges to the single cartridge interface 107. The single cartridge interface 107 then elevates to the system 100(*b*) where the tape cartridge is automatically passed to a cartridge picker, e.g. 100, in the system 100(*b*). The cartridge picker in the system 100(*b*) could then exchange the tape cartridge with the tape drive, e.g. 101 or the magazines, 103(*a*) and 103(*b*), in the system 100(*b*). Cartridges could also be passed from the system 100(*b*) to the system 100(*a*) in a similar manner. Thus, the autoloader/library system 100 is customizable to a variety of applications with the capability of expansion at any time to provide both increased capacity and/or increased performance.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A single cartridge interface for an automated tape cartridge autoloader library system, the single cartridge interface comprising:
    a frame defining a central aperture configured for the exchange of a tape cartridge between a tape cartridge picker connected internal to the autoloader library system and an operator; and
    means connected to the frame for coupling with the tape cartridge during an ejection of the tape cartridge from the single cartridge interface to permit removal of the tape cartridge from the single cartridge interface but prevent reinsertion of the tape cartridge into the single cartridge interface when the tape cartridge picker is not positioned to receive the tape cartridge.

2. The single cartridge interface of claim 1 comprising:
    means for preventing insertion of tape cartridges into the single cartridge interface when the cartridge picker is not positioned to receive the tape cartridge.

3. The single cartridge interface of claim 2 wherein the means for preventing insertion of the tape cartridges includes:
    a door pivotally connected to the frame within the central aperture; and
    a doorstop configured to cooperate with the door to prevent the insertion of the tape cartridges into the single cartridge interface when the cartridge picker is not positioned to receive the tape cartridges.

4. The single cartridge interface of claim 1 wherein the means for coupling to the tape cartridge during the ejection of the tape cartridge includes a cartridge stop link pivotally connected to the frame.

5. The single cartridge interface of claim 4 wherein the means for coupling to the tape cartridge during the ejection of the tape cartridge includes at least one latch member integrally formed in the cartridge stop link and configured to couple to the tape cartridge during the ejection of the tape cartridge.

6. The single cartridge interface of claim 4 wherein the means for coupling to the tape cartridge during the ejection of the tape cartridge includes a pair of latch members integrally formed in the cartridge stop link and configured to couple to the tape cartridge during the ejection of the tape cartridge.

7. A single cartridge interface for an automated tape cartridge autoloader library system, the single cartridge interface comprising:

a frame defining a central aperture configured for the exchange of tape cartridges between a tape cartridge picker connected internal to the autoloader library system and an operator;

means connected to the frame for preventing reinsertion of an individual tape cartridge following an ejection of the individual tape cartridge from the single cartridge interface until the individual tape cartridge is removed from the single cartridge interface; and means within the frame for preventing insertion of the tape cartridges when the cartridge picker is not positioned to receive the tape cartridges from the single cartridge interface.

8. The single cartridge interface of claim 7 wherein the means for preventing insertion includes:

a door pivotally connected to the frame within the central aperture; and a doorstop configured to cooperate with the door to prevent the insertion of the tape cartridges into the single cartridge interface when the cartridge picker is not positioned to receive the tape cartridges.

9. The single cartridge interface of claim 7 wherein the means for preventing reinsertion includes:

a cartridge stop link pivotally connected to the frame.

10. The single cartridge interface of claim 9, wherein the means for preventing reinsertion includes:

at least one latch member configured to couple to the individual tape cartridge during an ejection operation, wherein once coupled, the individual tape cartridge is removable from the single cartridge interface but reinsertion of the individual tape cartridge into the single cartridge interface is prevented.

11. A method of operating a single cartridge interface, the method comprising:

ejecting a tape cartridge partially out of the single cartridge interface to permit operation of a cartridge picker; and responsive to ejecting the tape cartridge, coupling a cartridge stop link to the tape cartridge to permit removal of the tape cartridge from the single cartridge interface, but prevent reinsertion of the tape cartridge back into the single cartridge interface when the cartridge picker is not positioned to receive the tape cartridge from the single cartridge interface.

12. The method of claim 11 the method comprising:

preventing insertion of the tape cartridge into the single cartridge interface when the cartridge picker is not positioned to receive the tape cartridge from the single cartridge interface.

* * * * *